US011928306B2

(12) United States Patent
Stolzenberg et al.

(10) Patent No.: US 11,928,306 B2
(45) Date of Patent: Mar. 12, 2024

(54) TOUCHPAD NAVIGATION FOR AUGMENTED REALITY DISPLAY DEVICE

(71) Applicant: Snap Inc., Santa Monica, CA (US)

(72) Inventors: Karen Stolzenberg, Venice, CA (US); David Meisenholder, Manhattan Beach, CA (US); Mathieu Emmanuel Vignau, Los Angeles, CA (US); Joseph Timothy Fortier, Los Angeles, CA (US); Kaveh Anvaripour, Santa Monica, CA (US); Daniel Moreno, Los Angeles, CA (US); Kyle Goodrich, Venice, CA (US); Ilteris Kaan Canberk, Marina Del Rey, CA (US); Shin Hwun Kang, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/448,169

(22) Filed: Sep. 20, 2021

(65) Prior Publication Data

US 2022/0374131 A1 Nov. 24, 2022

Related U.S. Application Data

(60) Provisional application No. 63/190,686, filed on May 19, 2021.

(51) Int. Cl.
G06F 3/04815 (2022.01)
G02B 27/01 (2006.01)
(Continued)

(52) U.S. Cl.
CPC ..... *G06F 3/04815* (2013.01); *G02B 27/0101* (2013.01); *G02B 27/0172* (2013.01);
(Continued)

(58) Field of Classification Search
CPC ..... G06F 8/36; G06F 8/60; G06F 8/65; G06F 3/04883; G06F 3/04886; G06F 16/954;
(Continued)

(56) References Cited

U.S. PATENT DOCUMENTS 7,971,156 B2   6/2011   Albertson et al.
7,996,793 B2   8/2011   Latta et al.
(Continued)

FOREIGN PATENT DOCUMENTS

CN   103049761 B   8/2016
EP   3707693 A1    9/2020
(Continued)

OTHER PUBLICATIONS

"International Application Serial No. PCT/US2022/072397, International Search Report dated Sep. 6, 2022", 4 pgs.
(Continued)

*Primary Examiner* — Rayeez R Chowdhury
(74) *Attorney, Agent, or Firm* — SCHWEGMAN LUNDBERG & WOESSNER, P.A.

(57) ABSTRACT

Disclosed is a method of receiving and processing navigation inputs executed by one or more processors in a head-worn device system including one or more display devices, one or more cameras and a generally vertically-arranged touchpad. The method comprises displaying a first carousel of AR effects icons, receiving a first horizontal input on the touchpad, rotating the first carousel of AR effects icons in response to first horizontal input, receiving a first touch input on the touchpad to select a particular AR effects icon that is in a selection position in the first carousel, displaying a scene viewed by the one or more cameras, the scene being enhanced with AR effects corresponding to the particular AR effects icon, receiving content capture user input, and in
(Continued)

response to the content capture user input, capturing a new content item corresponding to the scene.

20 Claims, 16 Drawing Sheets

(51) Int. Cl.
    *G06F 3/04817* (2022.01)
    *G06F 3/0485* (2022.01)
    *G06F 3/0488* (2022.01)
    *G06T 19/00* (2011.01)

(52) U.S. Cl.
    CPC ........ *G06F 3/04817* (2013.01); *G06F 3/0485* (2013.01); *G06F 3/0488* (2013.01); *G06T 19/006* (2013.01); *G02B 2027/0138* (2013.01); *G02B 2027/0178* (2013.01)

(58) Field of Classification Search
    CPC .. G06F 3/03547; G06F 3/0482; G06F 3/0488; G06F 3/0485; G06F 3/0483; G06F 3/04845; G06F 3/04817; G06F 40/106; G06F 2203/04808; G06F 3/04847; G06F 3/017; G06F 2203/04806; G06F 2203/04803
    See application file for complete search history.

(56) References Cited

U.S. PATENT DOCUMENTS

| | | | |
|---|---|---|---|
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,200,742 | B1* | 12/2021 | Post .................. G06T 19/003 |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 2009/0012788 | A1 | 1/2009 | Gilbert et al. |
| 2010/0205563 | A1 | 8/2010 | Haapsaari et al. |
| 2011/0083111 | A1* | 4/2011 | Forutanpour ........... H04W 4/21 715/863 |
| 2011/0301934 | A1 | 12/2011 | Tardif |
| 2012/0210253 | A1* | 8/2012 | Luna .................. G06Q 10/107 715/753 |
| 2013/0232148 | A1* | 9/2013 | MacDonald .......... G06F 16/954 707/740 |
| 2013/0321255 | A1* | 12/2013 | Lamb ..................... G09G 3/003 345/156 |
| 2014/0171036 | A1 | 6/2014 | Simmons |
| 2014/0267400 | A1* | 9/2014 | Mabbutt ................. G06F 3/017 345/633 |
| 2014/0358913 | A1 | 12/2014 | Cai et al. |
| 2015/0120293 | A1 | 4/2015 | Wohlert et al. |
| 2015/0199064 | A1* | 7/2015 | Cho ................... G02B 27/0176 345/173 |
| 2015/0296340 | A1* | 10/2015 | Crutchfield ............ H04N 23/62 455/456.1 |
| 2015/0370320 | A1 | 12/2015 | Connor |
| 2016/0050165 | A1* | 2/2016 | Thomas ................. G06Q 10/10 715/752 |
| 2017/0123487 | A1 | 5/2017 | Hazra et al. |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2017/0357476 | A1* | 12/2017 | Dack ...................... H04R 3/005 |
| 2018/0143748 | A1 | 5/2018 | Ahmed et al. |
| 2018/0158370 | A1 | 6/2018 | Pryor |
| 2018/0260024 | A1* | 9/2018 | Maltz .................. G02B 27/017 |
| 2020/0004326 | A1* | 1/2020 | Sipolins ................ G06T 19/006 |
| 2020/0073550 | A1 | 3/2020 | Kizaki |
| 2020/0310601 | A1 | 10/2020 | Anvaripour et al. |
| 2021/0011612 | A1 | 1/2021 | Dancie et al. |
| 2021/0065464 | A1 | 3/2021 | Goodrich et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0200390 | A1 | 7/2021 | Luo et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1* | 12/2021 | Canberk ............. A63F 13/5255 |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |
| 2022/0374132 | A1 | 11/2022 | Stolzenberg et al. |

FOREIGN PATENT DOCUMENTS

| | | |
|---|---|---|
| KR | 20220158824 | 12/2022 |
| WO | WO-2016168591 A1 | 10/2016 |
| WO | WO-2019094618 A1 | 5/2019 |
| WO | 2020226790 | 11/2020 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | 2022246399 | 11/2022 |
| WO | 2022246418 | 11/2022 |

OTHER PUBLICATIONS

"International Application Serial No. PCT/US2022/072397, Written Opinion dated Sep. 6, 2022", 7 pgs.

"U.S. Appl. No. 17/479,153, Non Final Office Action dated Jun. 24, 2022", 9 pgs.

"International Application Serial No. PCT US2022 072367, International Search Report dated Sep. 21, 2022", 4 pgs.

"International Application Serial No. PCT US2022 072367, Written Opinion dated Sep. 21, 2022", 7 pgs.

"U.S. Appl. No. 17/479,153, Response filed Oct. 24, 2022 to Non Final Office Action dated Jun. 24, 2022", 11 pgs.

(56) References Cited

OTHER PUBLICATIONS

"U.S. Appl. No. 17/479,153, Final Office Action dated Jan. 25, 2023", 10 pgs.

* cited by examiner

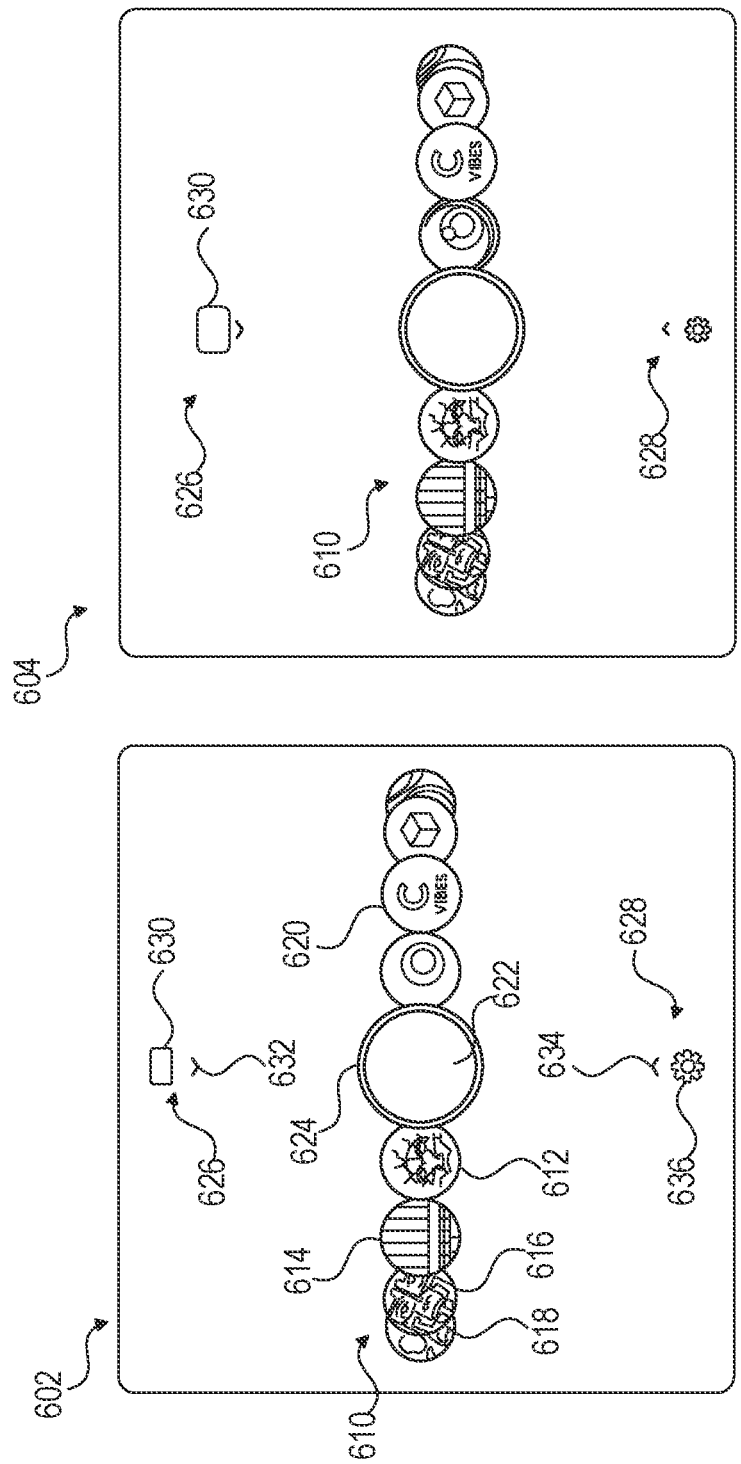

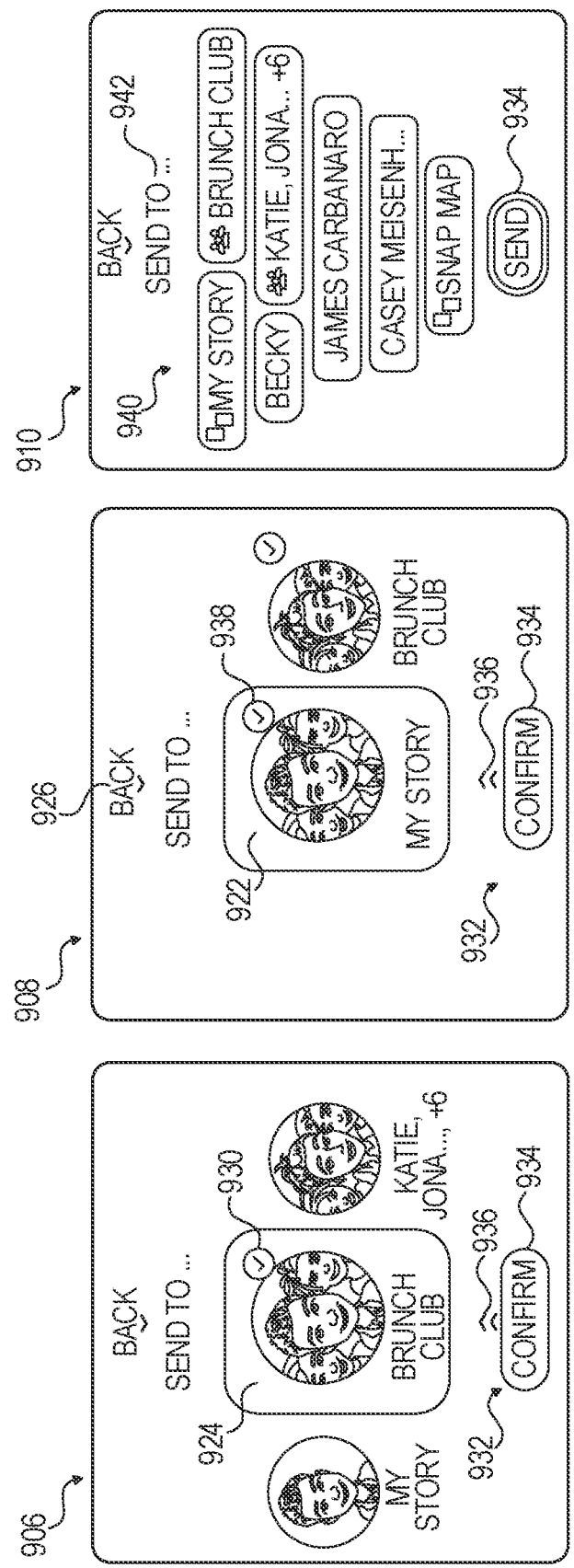

TOUCHPAD NAVIGATION FOR AUGMENTED REALITY DISPLAY DEVICE

CLAIM OF PRIORITY

This application claims the benefit of U.S. Provisional Patent Application No. 63/190,686 filed May 19, 2021, the contents of which are incorporated herein by reference as if explicitly set forth.

TECHNICAL FIELD

The present disclosure relates generally to head-worn devices with displays for augmented or virtual reality, and more particularly to head-worn devices including a touchpad for navigating content or user interfaces provided by the head-worn device or an associated device.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality."

A head-worn device may additionally completely occlude a user's visual field and display a virtual environment through which a user may move or be moved. This is typically referred to as "virtual reality." As used herein, the term "augmented reality" or "AR" refers to both augmented reality and virtual reality as traditionally understood, unless the context indicates otherwise.

A user of the head-worn device may access a messaging or social network application to view or share content with other users of the application. In some cases, live or stored content can be viewed and enhanced or modified by the user. That is, images, video or other media for enhancement can be captured from a live camera or can be retrieved from local or remote data storage.

As referred to herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real world are enhanced by computer-generated perceptual information. In this context an "augmented reality effect" comprises the collection of data, parameters, and other assets needed to apply a selected augmented reality experience to an image or a video feed. In some examples, augmented reality effects are provided by Snap, Inc. under the registered trademark LENSES.

In some examples, an augmented reality effect includes augmented reality (or "AR") content configured to modify or transform image data presented within a GUI of the head-worn device in some way. For example, complex additions or transformations to the content images may be performed using AR effect data, such as adding rabbit ears to the head of a person, adding floating hearts with background coloring, altering the proportions of a person's features, adding enhancements to landmarks in a scene being viewed on a head-worn device or many numerous other such transformations. This includes both real-time modifications that modify an image as it is captured using a camera associated with the head-worn device, which is then displayed by the head-worn device with the AR effect modifications, as well as modifications to stored content, such as video clips in a gallery that may be modified using AR effects. Similarly, real-time video capture may be used with an AR effect to show to a user of a head-worn device how video images currently being captured by sensors of a device would modify the captured data. Such data may simply be displayed on the screen and not stored in memory, the content captured by the device sensors may be recorded and stored in memory with or without the AR effect modifications (or both), or the content captured by the device sensors may be transmitted, with the AR effect modification, over the network 102 to a server or another device.

AR effects and associated systems and modules for modifying content using AR effects may thus involve detection of objects (e.g., faces, hands, bodies, cats, dogs, surfaces, objects), tracking of such objects as they leave, enter, and move around the field of view in video frames, and the modification or transformation of such objects as they are tracked. In various examples, different methods for achieving such transformations may be used. For example, some examples may involve generating a 3D mesh model of the object or objects, and using transformations and animated textures of the model within the video to achieve the transformation. In other examples, tracking of points on an object may be used to place an image or texture, which may be two dimensional or three dimensional, at the tracked position. In still further examples, neural network analysis of video frames may be used to place images, models, or textures in content (e.g., images or frames of video). AR effect data thus may include both the images, models, and textures used to create transformations in content, as well as additional modeling and analysis information needed to achieve such transformations with object detection, tracking, and placement.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 6A-6D illustrate a sequence of user interface screens displayed by the head-worn device of FIG. 1 or FIG. 5 in accordance with some examples FIGS. 9A-9F illustrate a further sequence of user interface screens displayed by the head-worn device of FIG. 1 or FIG. 5 in accordance with some examples.

DETAILED DESCRIPTION

Figure 1:
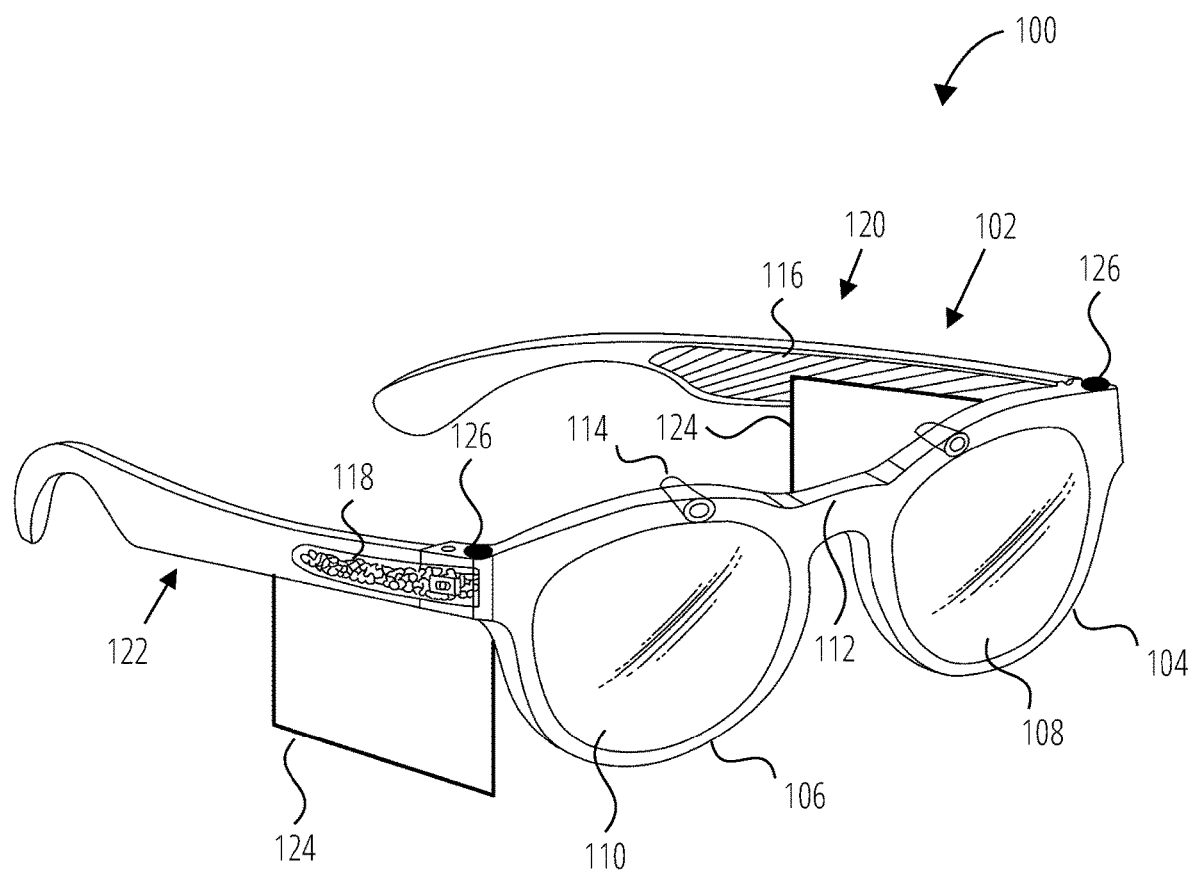
FIG. 1 is a perspective view of a head-worn device, in accordance with some examples.

Known head-worn devices, such as AR spectacles, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality experience for the user. The display may for example include a waveguide that receives a light beam from a projector but any appropriate display for presenting augmented or virtual content to the wearer may be used.

Navigation of the information or a user interface of the head-worn device may in some cases be provided by voice commands or by input to an associated device such as a smartphone. In the current case, a touchpad is provided on the head-worn device, which may be used to provide x-y touch and tap input to the head-worn device. Due to the possibility of the touchpad having a limited size and the displays either having limited display capabilities or due to size, power or other considerations (e.g., to provide a display through which a user can still view the real world), it may be necessary to simplify the interaction between the head-worn device and a user.

The described user interface flow uses specific patterns based on the capabilities of head-worn device hardware and software, which typically have both different input options and different output capabilities compared to a mobile phone and its touch screen. For example, the display(s) used in AR spectacles may have a narrower field of view, with a different aspect ratio, and may be capable of rendering less detail than a mobile phone screen. Additionally, the touch interface described below is not collocated with or parallel to the displays. These technical challenges can be addressed by providing a simplified user interface screen with less elements displayed per scene and with certain responses to received inputs, thus improving the functionality of the head-worn device and associated applications.

In one example, the head-worn device described herein uses absolute, indirect positioning for user interaction. In this example, there is no free cursor or ability to select any displayed element as on a mobile phone touch screen. The head-worn device indirectly translates user finger motion on a touchpad to display coordinates with absolute movement, in conjunction with a single fixed selector that responds to a set of specific touchpad gesture actions for item selection, as well as displayed navigation cues to permit selection of logical transitions between screens.

In one example, a method of receiving and processing navigation inputs executed by one or more processors in a head-worn device system including one or more display devices, one or more cameras and a generally vertically-arranged touchpad. The method includes displaying a first carousel of AR effects icons, receiving a first horizontal input on the touchpad, rotating the first carousel of AR effects icons in response to first horizontal input, and receiving a first touch input on the touchpad to select a particular AR effects icon that is in a selection position in the first carousel. The method further includes displaying a scene viewed by the one or more cameras, the scene being enhanced with AR effects corresponding to the particular AR effects icon, receiving content capture user input, and in response to the content capture user input, capturing a new content item corresponding to the scene.

The method may further include receiving a first vertical input on the touchpad while the first carousel of AR effects items is being displayed, and in response to the first vertical input, displaying a second carousel that includes a plurality of content items.

Still further, the method may include receiving a second horizontal input on the touchpad, rotating the second carousel of content items in response to the second horizontal input, receiving a second touch input on the touchpad to select a particular content icon that is in a selection position in the second carousel, and displaying further user interface options in response to receiving the second touch input.

The first vertical input may be a downward swipe, the method further including displaying a content icon and a downward pointer above the first carousel. A second vertical input may be received on the touchpad while the second carousel including a plurality of content items is being displayed, and in response to the second vertical input, the first carousel of AR effects items may be displayed.

The method may also include receiving a third vertical input on the touchpad while the first carousel is being displayed, the third vertical input being in a direction that is opposite to the first vertical input, and in response to the third vertical input, displaying system information.

In another example, a head-worn device system comprises one or more cameras, one or more display devices, a generally vertically-arranged touchpad, one or more processors, and a memory storing instructions that, when executed by the one or more processors, configure the system to perform operations. Also provided is a non-transitory computer-readable storage medium, the computer-readable storage medium including instructions that when executed by a head-worn device system including one or more display devices, one or more cameras and a generally vertically-arranged touchpad, cause the head-worn device system to perform operations.

The operations may include displaying a first carousel of AR effects icons, receiving a first horizontal input on the touchpad, rotating the first carousel of AR effects icons in response to first horizontal input, and receiving a first touch input on the touchpad to select a particular AR effects icon that is in a selection position in the first carousel. The operations further include displaying a scene viewed by the one or more cameras, the scene being enhanced with AR effects corresponding to the particular AR effects icon, receiving content capture user input, and in response to the content capture user input, capturing a new content item corresponding to the scene.

The operations may further include receiving a first vertical input on the touchpad while the first carousel of AR effects items is being displayed, and in response to the first vertical input, displaying a second carousel that includes a plurality of content items.

Still further, the operations may include receiving a second horizontal input on the touchpad, rotating the second carousel of content items in response to the second horizontal input, receiving a second touch input on the touchpad to select a particular content icon that is in a selection position in the second carousel, and displaying further user interface options in response to receiving the second touch input.

The first vertical input may be a downward swipe, the operations then further including displaying a content icon and a downward pointer above the first carousel. A second vertical input may be received on the touchpad while the second carousel including a plurality of content items is being displayed, and in response to the second vertical input, the first carousel of AR effects items may be displayed.

The operations may also include receiving a third vertical input on the touchpad while the first carousel is being displayed, the third vertical input being in a direction that is opposite to the first vertical input, and in response to the third vertical input, displaying system information. Other technical features may be readily apparent to one skilled in the art from the following figures, descriptions, and claims.

FIG. 1 is perspective view of a head-worn device (e.g., glasses 100), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. Each of the right optical element 110 and the left optical element 108 can be a lens, a display, a display assembly, or a combination of the foregoing. Any suitable display assembly can be provided in the glasses 100.

The frame 102 additionally includes a left arm or temple piece 120 and a right arm or temple piece 122. In some examples the entire frame 102 can be formed from a single piece of material so as to have a unitary or integral construction.

The glasses 100 can include a computing device, such as a computer 118, which can be of any suitable type so as to be carried by the frame 102 and, in one or more examples, of a suitable size and shape, so as to be at least partially disposed in one of the temple piece 120 and the temple piece 122. The computer 118 can include one or more processors with memory, wireless communication circuitry, and a power source. As discussed below, the computer 118 comprises low-power circuitry, high-speed circuitry, and a display processor. Various other examples may include these elements in different configurations or integrated together in different ways. Additional details of aspects of computer 118 may be implemented as illustrated by the data processor 302 discussed below.

The computer 118 additionally includes a battery 116 or other suitable portable power supply. In one example, the battery 116 is disposed in left temple piece 120 and is electrically coupled to the computer 118 disposed in the right temple piece 122. The glasses 100 can include a connector or port (not shown) suitable for charging the battery 116, a wireless receiver, transmitter or transceiver (not shown), or a combination of such devices.

The glasses 100 include cameras 114. Although two cameras are depicted, other examples contemplate the use of a single or additional (i.e., more than two) cameras. In one or more examples, the glasses 100 include any number of input sensors or other input/output devices in addition to the camera 114. Such sensors or input/output devices can additionally include biometric sensors, location sensors, motion sensors, and so forth.

The glasses 100 may also include a touchpad 124 mounted to or integrated with one or both of the left temple piece 120 and right temple piece 122. The touchpad 124 is generally vertically-arranged, approximately parallel to a user's temple in one example. As used herein, generally vertically aligned means that the touchpad is at least more vertical than horizontal, although preferably more vertical than that. Additional user input may be provided by one or more buttons 126, which in the illustrated embodiment are provided on the outer upper edges of the left optical element holder 104 and right optical element holder 106. The one or more touchpads 124 and buttons 126 provide a means whereby the glasses 100 can receive input from a user of the glasses 100.

Figure 2:
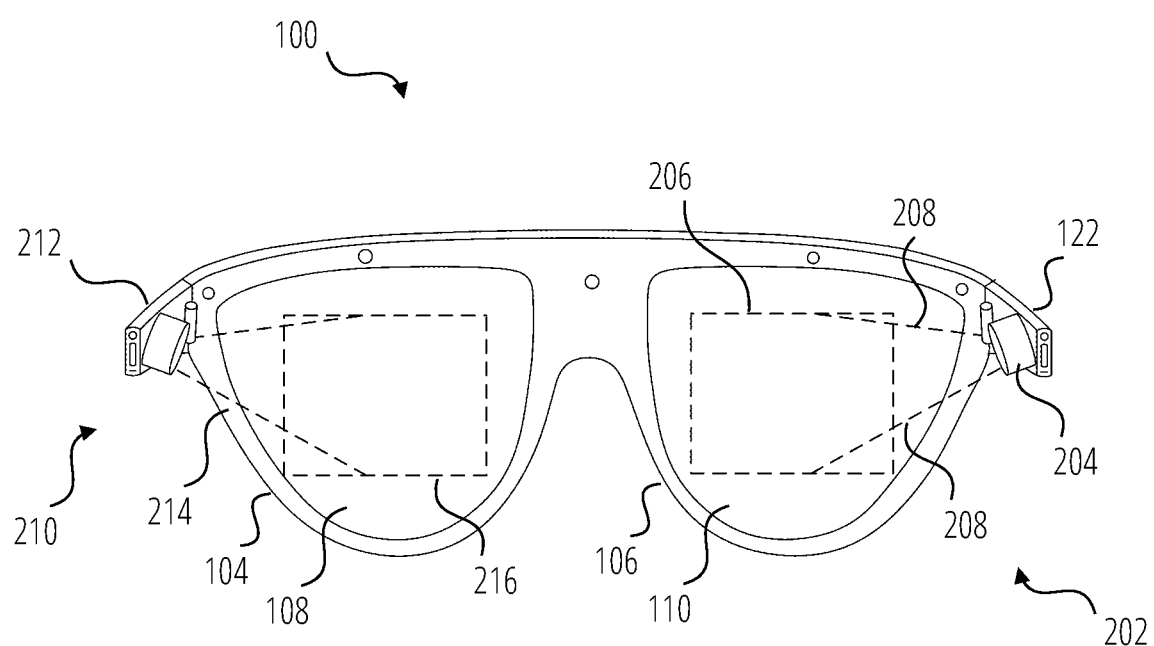
FIG. 2 illustrates a further view of the head-worn device of FIG. 1, in accordance with some examples.

FIG. 2 illustrates the glasses 100 from the perspective of a wearer. For clarity, a number of the elements shown in FIG. 1 have been omitted. As described in FIG. 1, the glasses 100 shown in FIG. 2 include left optical element 108 and right optical element 110 secured within each of the left optical element holder 104 and the right optical element holder 106 respectively.

The glasses 100 include forward optical assembly 202 comprising a right projector 204 and a right near eye display 206, and a forward optical assembly 210 comprising a left projector 212 and a near eye display 216.

In one embodiment, the near eye displays are waveguides. The waveguides includes reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real world seen by the user. Similarly, light 214 emitted by the projector 212 encounters the diffractive structures of the waveguide of the near eye display 216, which directs the light towards the left eye of a user to provide an image on or in the left optical element 108 that overlays the view of the real world seen by the user.

It will be appreciated however that other display technologies or configurations may be provided that can display an image to a user in a forward field of view. For example instead of a projector 204 and a waveguide, an LCD, LED or other display panel or surface may be provided instead.

In use, a wearer of the glasses 100 will be presented with information, content and various user interfaces on the near eye displays. As described in more detail below, the user can then interact with the glasses 100 using a touchpad 124 and/or the buttons 126, in addition to providing voice inputs or touch inputs on an associated device, for example client device 328 illustrated in FIG. 3.

Figure 3:
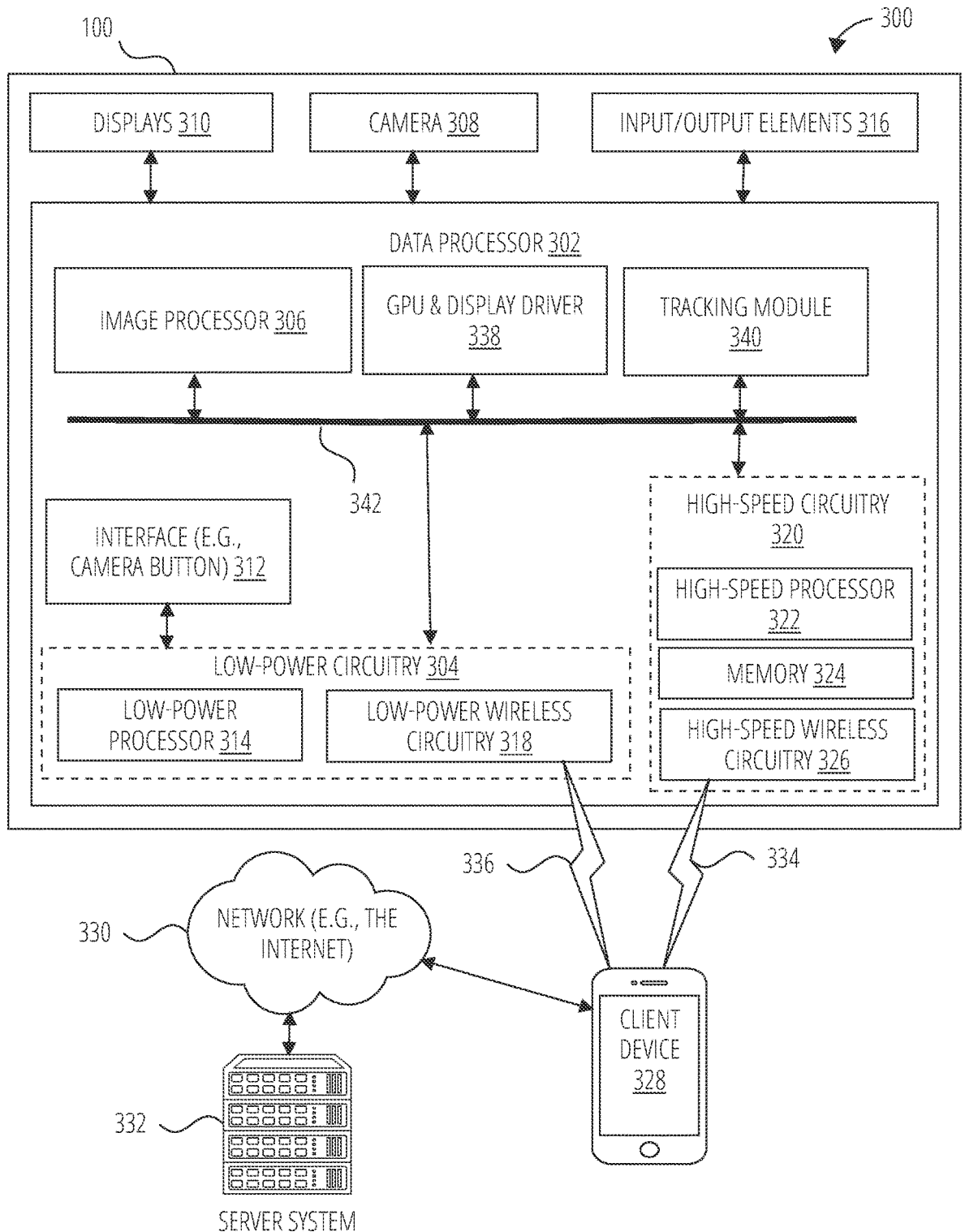
FIG. 3 is a block diagram illustrating a networked system 300 including details of the head-worn device of FIG. 1, in accordance with some examples.

FIG. 3 is a block diagram illustrating a networked system 300 including details of the glasses 100, in accordance with some examples.

The networked system 300 includes the glasses 100, a client device 328, and a server system 332. The client device 328 may be a smartphone, tablet, phablet, laptop computer, access point, or any other such device capable of connecting with the glasses 100 using both a low-power wireless connection 336 and a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 1304 or the machine 1400 described in FIG. 13 and FIG. 14.

The glasses 100 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 13 and FIG. 14. For example, the input/output elements 316 may include any of I/O components 1406 including output components 1428, motion components 1436, and so forth. Examples of the displays 310 are discussed in FIG. 2. In the particular examples described herein, the displays 310 include a display for each one of a user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In other examples, the interface 312 may be any mechanical switch or physical interface capable of accepting user inputs associated with a request for data from the camera 308. In other examples, the interface 312 may have a software component, or may be associated with a command received wirelessly from another source, such as from the client device 328.

The image processor 306 includes circuitry to receive signals from the camera 308 and process those signals from the camera 308 into a format suitable for storage in the memory 324 or for transmission to the client device 328. In one or more examples, the image processor 306 (e.g., video processor) comprises a microprocessor integrated circuit (IC) customized for processing sensor data from the camera 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 100. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system needed for the data processor 302. The high-speed processor 322 includes processing resources needed for managing high-speed data transfers on the high-speed wireless connection 334 using the high-speed wireless circuitry 326. In certain examples, the high-speed processor 322 executes an operating system such as a LINUX operating system or other such operating system such as the operating system 1312 of FIG. 13. In addition to any other responsibilities, the high-speed processor 322 executing a software architecture for the data processor 302 is used to manage data transfers with the high-speed wireless circuitry 326. In certain examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the camera 308 and the image processor 306. While the memory 324 is shown as integrated with the high-speed circuitry 320, in other examples, the memory 324 may be an independent stand-alone element of the data processor 302. In certain such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is needed.

The tracking module 340 estimates a pose of the glasses 100. For example, the tracking module 340 uses image data and corresponding inertial data from the camera 308 and the position components 1440, as well as GPS data, to track a location and determine a pose of the glasses 100 relative to a frame of reference (e.g., real-world environment). The tracking module 340 continually gathers and uses updated sensor data describing movements of the glasses 100 to determine updated three-dimensional poses of the glasses 100 that indicate changes in the relative position and orientation relative to physical objects in the real-world environment. The tracking module 340 permits visual placement of virtual objects relative to physical objects by the glasses 100 within the field of view of the user via the displays 310.

The GPU & display driver 338 may use the pose of the glasses 100 to generate frames of virtual content or other content to be presented on the displays 310 when the glasses 100 are functioning in a traditional augmented reality mode. In this mode, the GPU & display driver 338 generates updated frames of virtual content based on updated three-dimensional poses of the glasses 100, which reflect changes in the position and orientation of the user in relation to physical objects in the user's real-world environment.

One or more functions or operations described herein may also be performed in an application resident on the glasses 100 or on the client device 328, or on a remote server. For example, one or more functions or operations described herein may be performed by one of the applications 1306 such as messaging application 1346.

Networked Computing Environment

Figure 4:
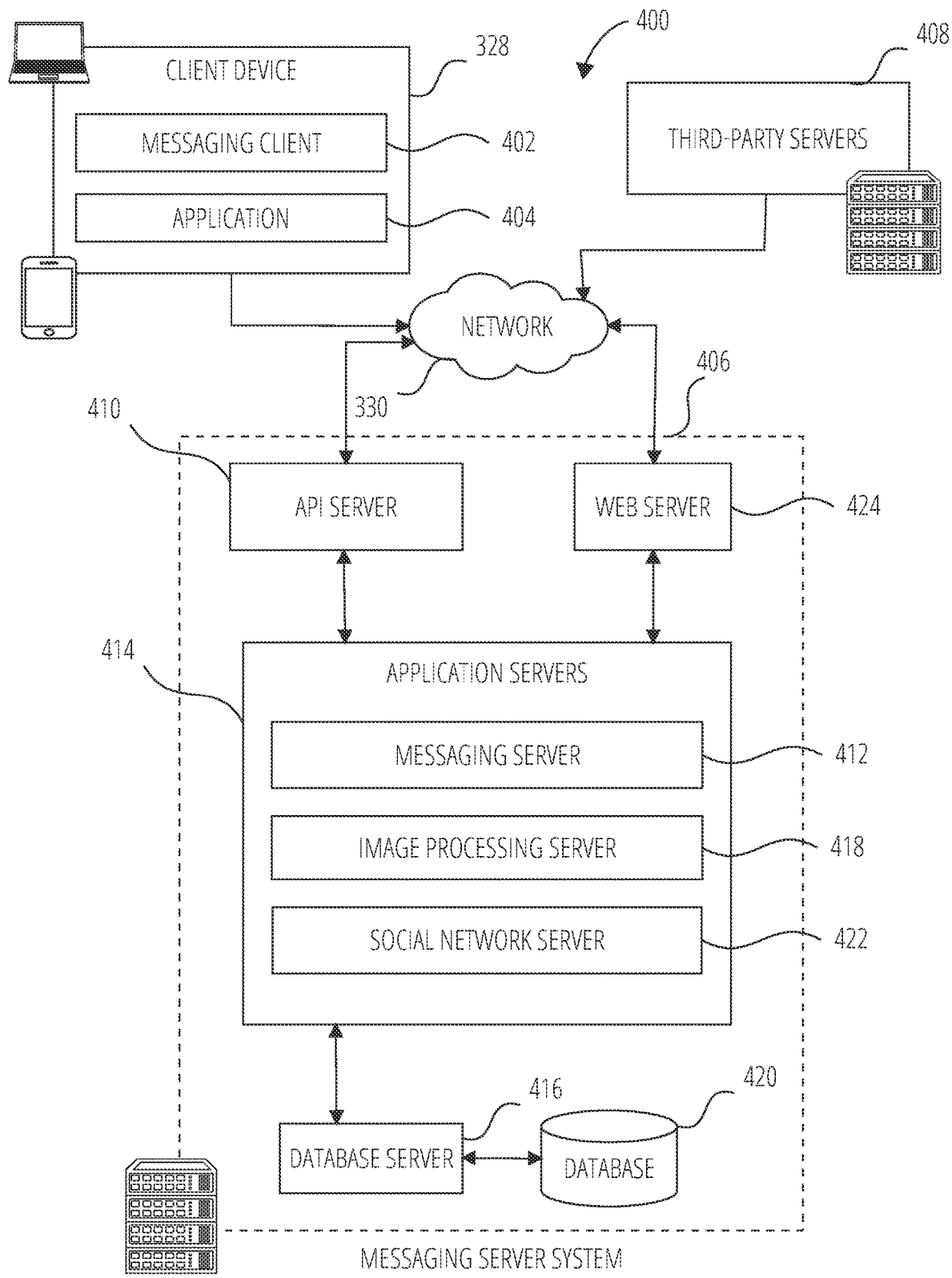
FIG. 4 is a diagrammatic representation of a networked environment in which the present disclosure may be deployed, in accordance with some examples.

FIG. 4 is a block diagram showing an example messaging system 400 for exchanging data (e.g., messages and associated content) over a network. The messaging system 400 includes multiple instances of a client device 328, each of which hosts a number of applications, including a messaging client 402 and other applications 404. Each messaging client 402 is communicatively coupled to other instances of the messaging client 402 (e.g., hosted on respective other client devices 328), a messaging server system 406 and third-party servers 408 via a network 330 (e.g., the Internet). A messaging client 402 can also communicate with locally-hosted applications 404 using Applications Program Interfaces (APIs).

A messaging client 402 is able to communicate and exchange data with other messaging clients 402 and with the messaging server system 406 via the network 330. The data exchanged between messaging clients 402, and between a messaging client 402 and the messaging server system 406, includes functions (e.g., commands to invoke functions) as well as payload data (e.g., text, audio, video or other multimedia data).

The messaging server system 406 provides server-side functionality via the network 330 to a particular messaging client 402. While certain functions of the messaging system 400 are described herein as being performed by either a messaging client 402 or by the messaging server system 406, the location of certain functionality either within the messaging client 402 or the messaging server system 406 may be a design choice. For example, it may be technically preferable to initially deploy certain technology and functionality within the messaging server system 406 but to later migrate this technology and functionality to the messaging client 402 where a client device 328 has sufficient processing capacity.

The messaging server system 406 supports various services and operations that are provided to the messaging client 402. Such operations include transmitting data to, receiving data from, and processing data generated by the messaging client 402. This data may include message content, client device information, geolocation information, media augmentation and overlays, message content persistence conditions, social network information, and live event information, as examples. Data exchanges within the messaging system 400 are invoked and controlled through functions available via user interfaces (UIs) of the messaging client 402.

Turning now specifically to the messaging server system 406, an Application Program Interface (API) server 410 is coupled to, and provides a programmatic interface to, application servers 414. The application servers 414 are communicatively coupled to a database server 416, which facilitates access to a database 420 that stores data associated with messages processed by the application servers 414. Similarly, a web server 424 is coupled to the application servers 414, and provides web-based interfaces to the application servers 414. To this end, the web server 424 processes incoming network requests over the Hypertext Transfer Protocol (HTTP) and several other related protocols.

The Application Program Interface (API) server 410 receives and transmits message data (e.g., commands and message payloads) between the client device 328 and the application servers 414. Specifically, the Application Program Interface (API) server 410 provides a set of interfaces (e.g., routines and protocols) that can be called or queried by the messaging client 402 in order to invoke functionality of the application servers 414. The Application Program Interface (API) server 410 exposes various functions supported by the application servers 414, including account registration, login functionality, the sending of messages, via the application servers 414, from a particular messaging client 402 to another messaging client 402, the sending of media files (e.g., images or video) from a messaging client 402 to a messaging server 412, and for possible access by another messaging client 402, the settings of a collection of media data (e.g., story), the retrieval of a list of friends of a user of a client device 328, the retrieval of such collections, the retrieval of messages and content, the addition and deletion of entities (e.g., friends) to an entity graph (e.g., a social graph), the location of friends within a social graph, and opening an application event (e.g., relating to the messaging client 402).

The application servers 414 host a number of server applications and subsystems, including for example a messaging server 412, an image processing server 418, and a social network server 422. The messaging server 412 implements a number of message processing technologies and functions, particularly related to the aggregation and other processing of content (e.g., textual and multimedia content) included in messages received from multiple instances of the messaging client 402. As will be described in further detail, the text and media content from multiple sources may be aggregated into collections of content (e.g., called stories or galleries). These collections are then made available to the messaging client 402. Other processor and memory intensive processing of data may also be performed server-side by the messaging server 412, in view of the hardware requirements for such processing.

The application servers 414 also include an image processing server 418 that is dedicated to performing various image processing operations, typically with respect to images or video within the payload of a message sent from or received at the messaging server 412.

The social network server 422 supports various social networking functions and services and makes these functions and services available to the messaging server 412. To this end, the social network server 422 maintains and accesses an entity graph within the database 420. Examples of functions and services supported by the social network server 422 include the identification of other users of the messaging system 400 with which a particular user has relationships or is "following," and also the identification of other entities and interests of a particular user.

Returning to the messaging client 402, features and functions of an external resource (e.g., an application 404 or applet) are made available to a user via an interface of the messaging client 402. In this context, "external" refers to the fact that the application 404 or applet is external to the messaging client 402. The external resource is often provided by a third party but may also be provided by the creator or provider of the messaging client 402. The messaging client 402 receives a user selection of an option to launch or access features of such an external resource. The external resource may be the application 404 installed on the client device 328 (e.g., a "native app"), or a small-scale version of the application (e.g., an "applet") that is hosted on the client device 328 or remote of the client device 328 (e.g., on third-party servers 408). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 402. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 402 determines whether the selected external resource is a web-based external resource or a locally-installed application 404. In some cases, applications 404 that are locally installed on the client device 328 can be launched independently of and separately from the messaging client 402, such as by selecting an icon, corresponding to the application 404, on a home screen of the client device 328. As used herein, an icon can include one or both of text and graphic elements. Small-scale versions of such applications can be launched or accessed via the messaging client 402 and, in some examples, no or limited portions of the small-scale application can be accessed outside of the messaging client 402. The small-scale application can be launched by the messaging client 402 receiving, from a third-party server 408 for example, a markup-language document associated with the small-scale application and processing such a document.

In response to determining that the external resource is a locally-installed application 404, the messaging client 402 instructs the client device 328 to launch the external resource by executing locally-stored code corresponding to the external resource. In response to determining that the external resource is a web-based resource, the messaging client 402 communicates with the third-party servers 408 (for example) to obtain a markup-language document corresponding to the selected external resource. The messaging client 402 then processes the obtained markup-language document to present the web-based external resource within a user interface of the messaging client 402.

The messaging client 402 can notify a user of the client device 328, or other users related to such a user (e.g., "friends"), of activity taking place in one or more external resources. For example, the messaging client 402 can provide participants in a conversation (e.g., a chat session) in the messaging client 402 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 402, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 402. The external resource can selectively include different media items in the responses, based on a current context of the external resource.

Figure 5:
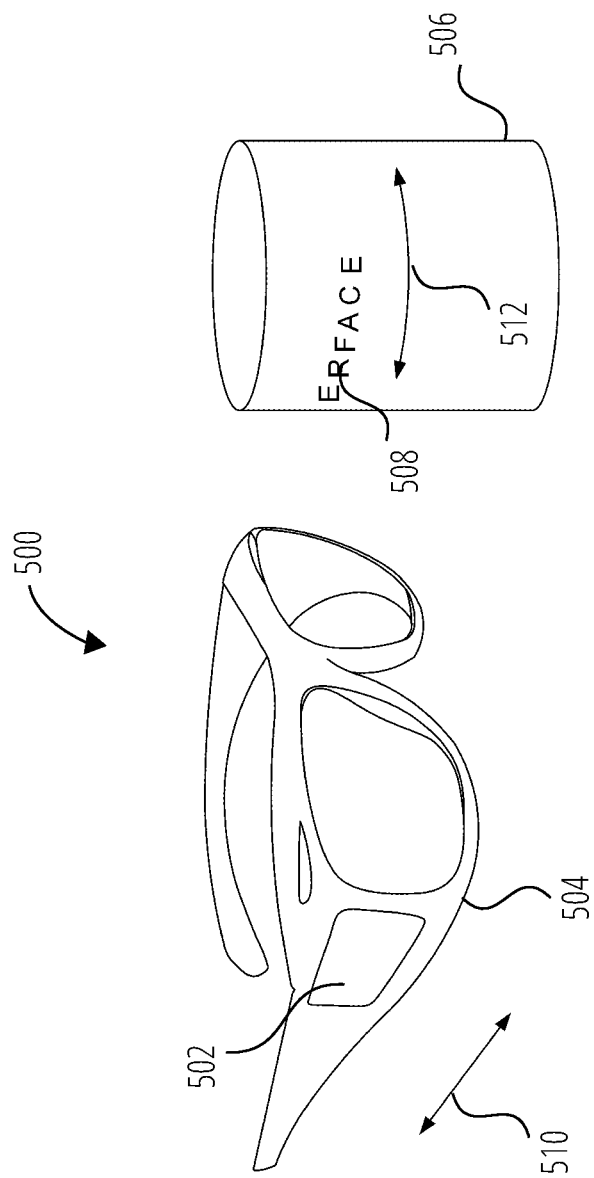
FIG. 5 is perspective view of a head-worn device, in accordance with another example.

FIG. 5 is perspective view of a head-worn device (e.g., glasses 500), in accordance with another example. As can be seen, in this example, a touchpad 502 is integrated into a frame 504, the front part of which wraps around the user's eyes. The presence of the touchpad 502 in glasses 500 is thus less obtrusive and the overall appearance of the head-worn device is more aesthetically pleasing.

Navigating a user interface on the glasses 500 using the touchpad 502 is done by presenting some user interface elements (e.g., icons or a content gallery) using a carousal arrangement, which is illustrated in FIG. 5 using a cylinder metaphor. As seen by a wearer of the glasses 500, user interface elements (such as text 508) are presented in a curved or curved-like arrangement such as on the surface of a cylinder 506. Forward and backward swipe inputs 510 received from the user by the glasses 500 along the touchpad 502 translate into rotation 512 of the user interface elements around the cylinder 506. More particularly, a forward swipe gesture on a right hand side touchpad 502 results in forward movement of the right hand side of the cylinder 506, causing perceived rotation of the user interface elements in an anticlockwise direction (as viewed from above) around the surface of the cylinder 506, and vice versa.

Upward or downward swipe gestures on the touchpad 502 typically translate into a selection of or transition into a different user interface screen, although this motion can also translate into scrolling up or down respectively in the current user interface screen, for example in or out of a zoomed-in image presented in the near eye displays 216 of the glasses 100.

As forward or backward swipe gestures continue to be received by the glasses 500, user interface elements or content will typically disappear from the right or left side respectively, while additional user interface elements or content will appear from the left or right side respectively. As user interface elements or content move towards the edge of the display, visual cues may be provided to illustrate the cylinder metaphor. For example, movement of a user interface element away from the center towards an edge may result in the particular element decreasing in size and vice versa. Furthermore, content or user interface elements locate more towards the center may progressively become overlapping with an outer adjacent content or user interface elements, with the elements becoming more stacked as they approach the edge of the cylinder. Depending on the implementation, the content or user interface elements may or may not themselves rotate away around their central axes as they move towards an edge. That is, in some instances the elements remain face on to the user as they decrease in size or become stacked.

FIG. 6 illustrates a sequence of user interface screens displayed by the head-worn device of FIG. 1 or FIG. 5 in accordance with some examples. More particularly, FIG. 6A is an example of a user interface screen 602 shown on one or both of the displays 310/216 of the glasses illustrated in FIG. 1 or FIG. 5, in some examples. As can be seen from the figure, the user interface screen 602 includes a carousel 610 of icons, which in the illustrated embodiment includes AR effects icon 612, AR effects icon 614, AR effects icon 616, AR effects icon 618 and AR effects icon 620 occupying positions from left to right on the user interface screen 602. Also disclosed is a null icon 622 occupying a central position 624 in the carousel 610. The circle illustrating the central position 624 is larger, to indicate that an icon in that position is available for selection in this example, but could also indicate that the icon in that position has been selected or is active. The null icon 622, which in the example is a plain color such as white or black, indicates that no icon or action is available for selection or selected when in the central position 624 in carousel 610.

Also, as can be seen, the icons in carousel 610 overlap by a progressively greater amount in the direction from the central position 624 to the edge of the user interface screen 602, to provide the cylinder metaphor described above with reference to FIG. 5. For example, AR effects icon 612 overlaps slightly with AR effects icon 614, which overlaps more with AR effects icon 616, which in turn overlaps even more with AR effects icon 618. In this example of the cylinder metaphor, the icons are shown face-on and (with the exception of an icon in the central position 624) are the same size across the carousel 610. In other implementations, the icons may also or alternatively decrease in size or rotate away as discussed above.

Forward or rearward swipe input on a touchpad 124/502 will cause left or right movement of the AR effects icons in the carousel 610 as discussed in more detail below with reference to FIG. 8A and FIG. 8B. The particular direction in which the carousel moves will depend on whether a touchpad on the left or the right side of the glasses 100/500 are being used as discussed above. When an AR effects icon occupies the central position, it can be selected by tapping on the touchpad 124/502.

The user interface screen 602 also includes navigation cues to provide an indication to the user as to the kind and direction of input needed to transition between different screens or modes. The navigation cues provide informational hints including both orientation and context cues for system navigation. The navigation cues show both the input action to take as well as the destination or outcome of the input action.

For example, navigation cue 626 includes a content gallery icon 630 and a pointer 632. The content gallery icon 630 provides an informational hint that a gallery of content may be accessed and the downward-facing pointer 632 provides an informational hint that a downward swipe on touchpad 124/502 will initiate a transition to the gallery screen as suggested by the content gallery icon 630. The navigation cue 626 is located in a position in the user interface screen 602 that is at the start of the direction of the user input that is required. That is, the navigation cue 626 is located at the top of the user interface screen 602 while the corresponding input action on the touchpad is downwards towards the bottom of the touchpad.

Similarly, navigation cue 628 includes a pointer 634 and a settings icon 636 The settings icon 636 provides an informational hint that a settings screen may be accessed and the upward-facing pointer 634 provides an informational hint that an upward swipe on touchpad 124/502 will initiate a transition to the settings screen as suggested by the settings icon 636. The navigation cue 628 is located in a position in the user interface screen 602 that is at the start of the direction of the user input that is required. That is, the navigation cue 628 is located at the bottom of the user interface screen 602 while the corresponding input action on the touchpad is upwards towards the top of a touchpad 124/502.

Figure 6C:
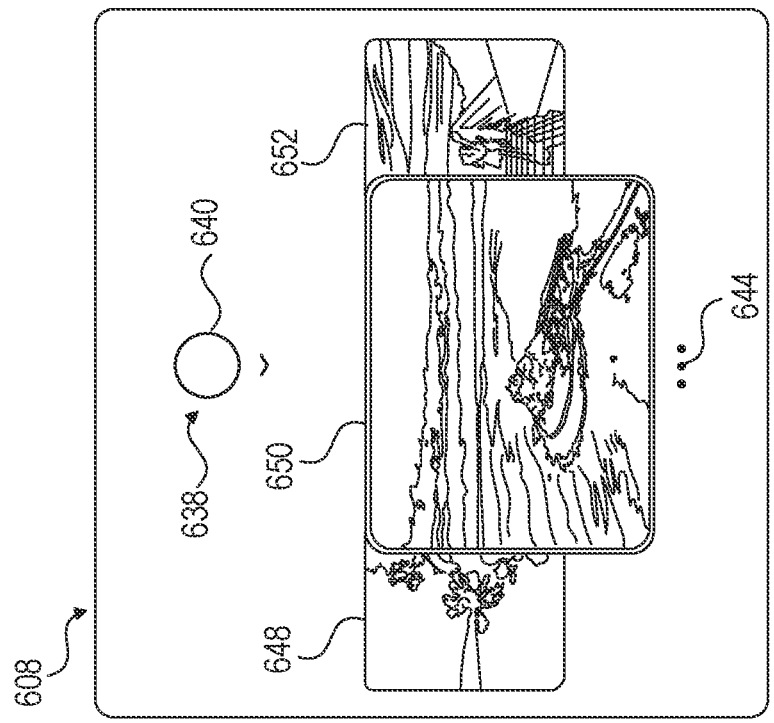

FIG. 6B is an example of a transitional screen between the user interface screen 602 and the content gallery user interface screen 606 of FIG. 6C. User interface screen 604 is shown initially in response to receiving a downward swipe on a touchpad 124/502 when the user interface screen 602 is displayed, as prompted by the content gallery icon 630 and pointer 632 as discussed above.

As can be seen, in user interface screen 604 the carousel 610, navigation cue 626 and navigation cue 628 have all moved downward, consistent with the receipt of a downward swipe on a touchpad 124/502. Additionally, the carousel 610 has bowed downward at the central position 624 as an additional visual confirmation of the downward-swipe input. The content gallery icon 630 also transitions to a square shape as the swipe input is received. The settings navigation cue 628 may also reduce in size or become greyed-out to deemphasize this option, since the user input that is being received is opposite to the swipe direction corresponding to the navigation cue 628.

As a continued downward swipe is received on touchpad 124/502, beyond a certain predetermined point the user interface screen 604 will transition to the user interface screen 606 discussed below. If the downward swipe terminates before the predetermined point is reached, the user interface screen 604 will snap back to the user interface screen 602.

FIG. 6C is an example of a content gallery user interface screen 606 shown in response to receiving a downward swipe on a touchpad 124/502 when the user interface screen 602 is displayed, as prompted by the content gallery icon 630 and pointer 632 and as discussed above.

The user interface screen 606 includes a carousel 646 of content items, which may for example be images or videos saved to a gallery of content associated with the user and that is stored on the client device 328, the glasses 100/500 or remotely. In one example, the content items include images or videos that have been captured by the user using the client device 328 or the glasses 100/500 while a selected AR effect has been applied.

In the illustrated example, the carousel 646 can be seen to include content item 650 in a central position in the user interface screen 606, as well as partially-obscured content item 648 and content item 652. As before, a forward or rearward swipe input on a touchpad 124/502 will cause left or right movement of the content items in the carousel 646, with content items sequentially replacing the current content item in the central position as the content item 650 moves left or right. The particular direction in which the content item 650 moves will depend on whether a touchpad on the left or the right side of the glasses 100/500 is being used as discussed above. A content item 650 occupying the central position can be selected by tapping on the touchpad 124/502. The result of such a selection is discussed below with reference to FIG. 9A.

The user interface screen 606 also includes a navigation cue 638 comprising an AR carousel icon 640 and a pointer 642. As before, the navigation cue 638 provides an informational hint that the AR effects carousel 610 illustrated in user interface screen 602 may be accessed/returned to and the downward-facing pointer 642 provides an informational hint that a downward swipe on touchpad 124/502 will initiate a transition to the user interface screen 602 as suggested by the AR carousel icon 640. Also, as before, the navigation cue 638 is located in a position in the user interface screen 606 that is at the start of the direction of the user input that is required. That is, the navigation cue 638 is located at the top of the user interface screen 606 while the corresponding input action on the touchpad is downwards towards the bottom of the touchpad.

Also included is a menu indicators or overflow indicators icon 644 indicating that additional user interface options are available in user interface screen 606. The lack of a pointer indicates that these options are not accessed by a vertical swipe on the touchpad 124/touchpad 502 but rather by a long press on a touchpad 124/502. In one example, such a long press will open a carousel of UI icons that can be navigated with scroll inputs, selected with touch inputs and dismissed with a downward swipe. In one example, the carousel of selectable UI icons includes the zoom icon 912, send icon 914 and delete icon 916 discussed below with reference to FIG. 9B.

Figure 6D:
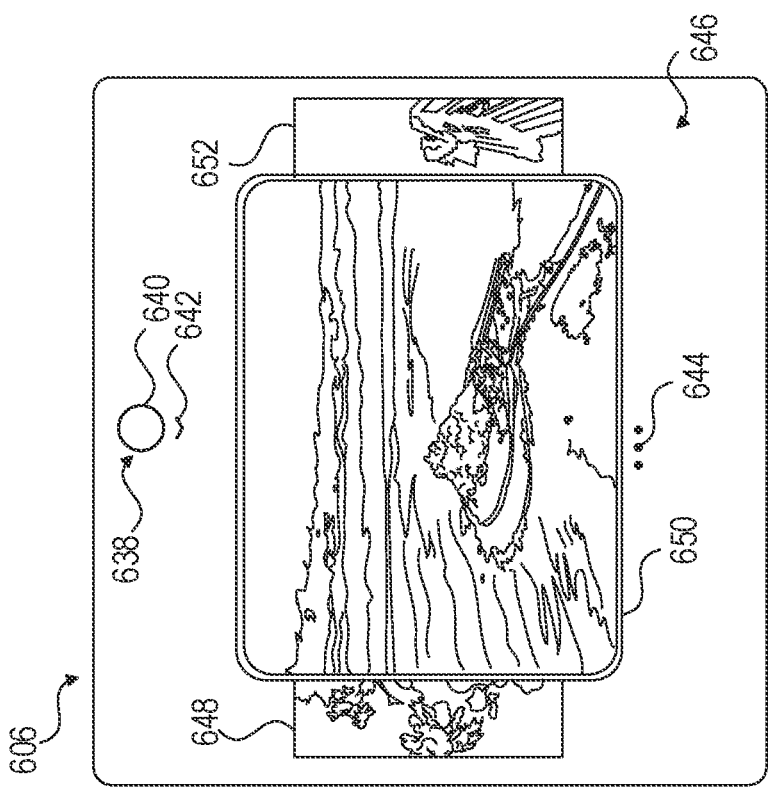

FIG. 6D is an example of a transitional user interface screen 608 displayed between the user interface screen 606 and the user interface screen 602 of FIG. 6A. User interface screen 608 is shown initially in response to receiving a downward swipe on a touchpad 124/502 when the user interface screen 606 is displayed, as prompted by the AR carousel icon 640 and pointer 642 as discussed above.

As can be seen, in user interface screen 608 the carousel 646, navigation cue 638 and icon 644 have all moved downward, consistent with the receipt of a downward swipe on a touchpad 124/502. Additionally, the content item 650 in the central position 624 has moved further down and reduced in size as additional visual confirmation of the downward-swipe input. The content gallery icon 630 also increases in size as the swipe input is received.

As a continued downward swipe is received on touchpad 124/502, beyond a certain predetermined point the user interface screen 608 will transition to the user interface screen 602 discussed above. If the downward swipe terminates before the predetermined point is reached, the user interface screen 608 will snap back to the user interface screen 606.

Figure 7B:
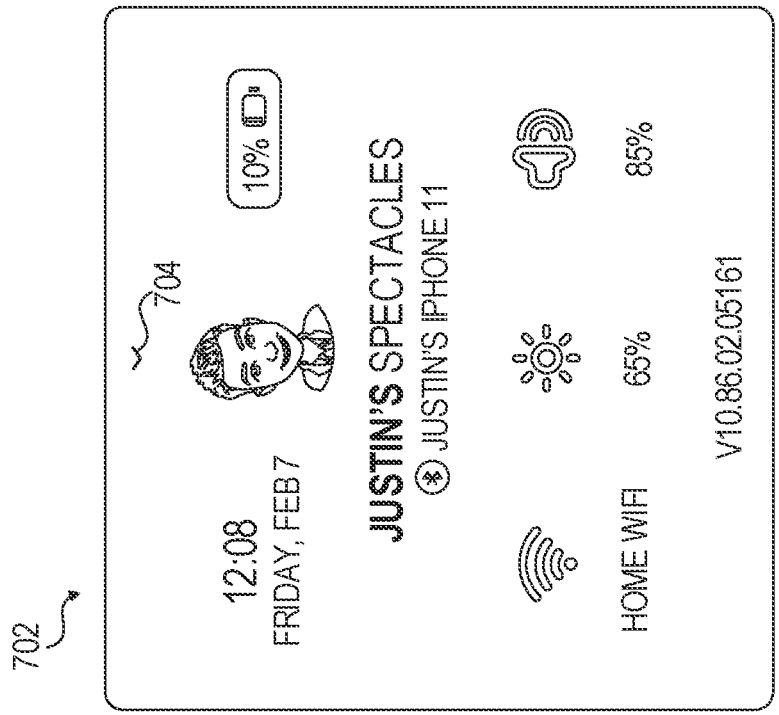
FIGS. 7A and 7B illustrate a further sequence of user interface screens displayed by the head-worn device of FIG. 1 or FIG. 5 in accordance with some examples
Figure 7A:
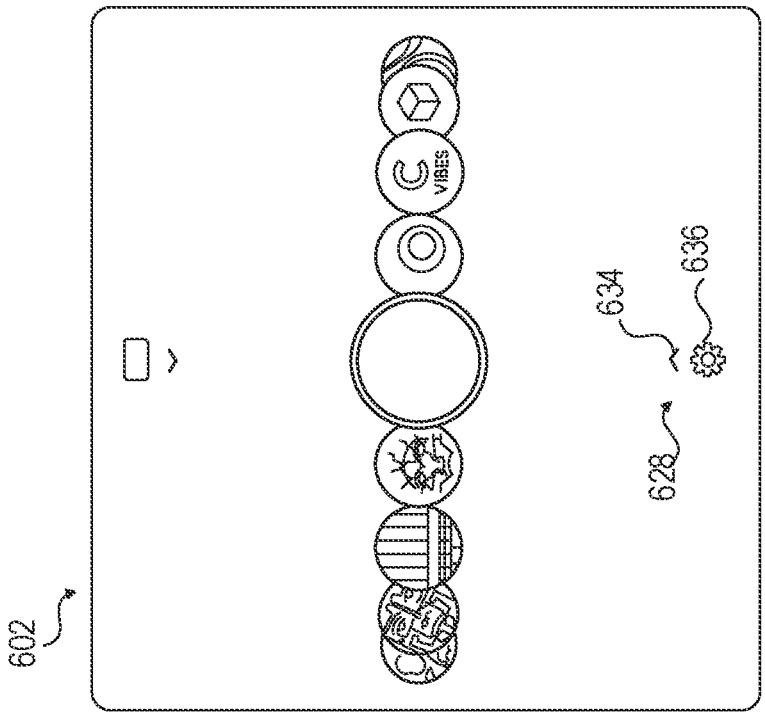

FIG. 7A and FIG. 7B illustrate a further sequence of user interface screens displayed by the head-worn device of FIG. 1 or FIG. 5 in accordance with some examples. More particularly, FIG. 7A and FIG. 7B illustrate the sequence of user interface screens shown when an upward swipe is received on a touchpad when the user interface screen 602 is displayed. Upon receipt of such an upward swipe as prompted by navigation cue 628, comprising settings icon 636 and pointer 634, settings user interface screen 702 is displayed. As can be seen, user interface screen 702 includes various information regarding the glasses 100/500 or the client device 328, such as battery level, speaker volume, Wi-Fi network identification and signal strength, display brightness, the user's name and avatar, time of day, date, and so forth.

There will be a return to the user interface screen 602 upon receipt of a downward swipe on touchpad 124/502 when user interface screen 702 is displayed, as indicated by pointer 704.

Figure 8C:
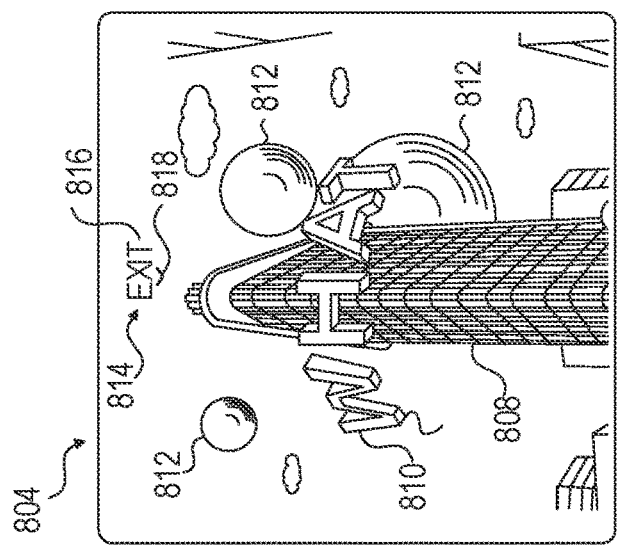
FIGS. 8A-8C illustrate a further sequence of user interface screens displayed by the head-worn device of FIG. 1 or FIG. 5 in accordance with some examples
Figure 8B:
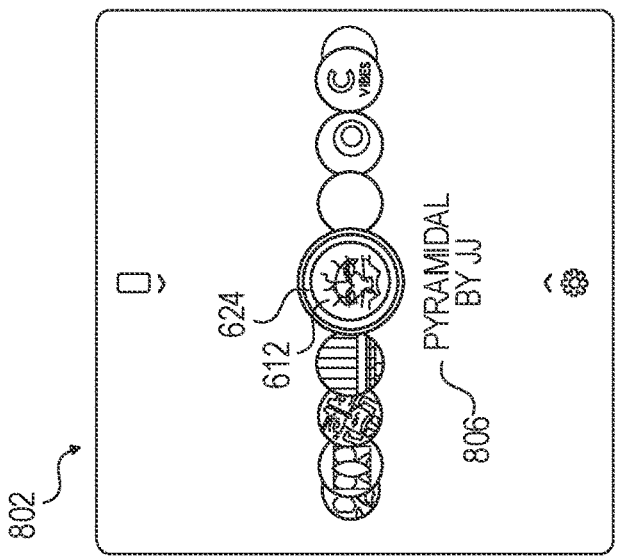
Figure 8A:
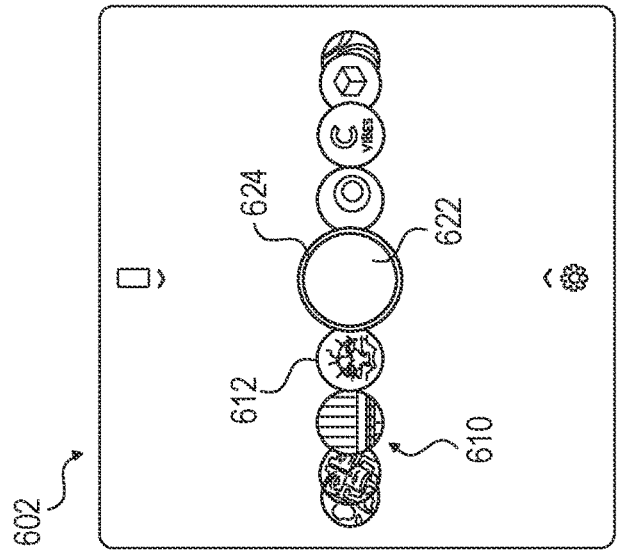

FIGS. 8A to 8C illustrate a further sequence of user interface screens displayed by the head-worn device of FIG. 1 or FIG. 5 in accordance with some examples. More particularly, FIGS. 8A to 8C illustrate example user interfaces depicting the selection and application of an AR effect using the carousel 610 of FIG. 6A.

FIG. 8A shows user interface screen 602 in which null icon 622 occupies the central position 624 in the carousel 610. Upon receipt of an appropriate forward or backward swipe motion on a touchpad 124/502, the icons in the carousel 610 rotate or scroll to the positions shown in user interface screen 802, in which an AR effects icon (for example the AR effects icon 612) occupies the central position 624. As can be seen, the AR effects icon 612 is increased in prominence not only by showing it in the central position but by a size increase compared to its former position shown in user interface screen 602. Bibliographic information 806 such as the name of the AR effects corresponding to AR effects icon 612 and its author may also be displayed in user interface screen 802 when AR effects icon 612 occupies central position 624.

AR effects icon 612 as shown in the central position 624 in user interface screen 802 is now available for selection or activation. Receipt of a tap by the user on a touchpad 124/502 results in the application of the AR effects corresponding to AR effects icon 612 as shown by user interface screen 804 in FIG. 8C one example. In this example, a live scene, captured by one or more of the cameras 114, includes a building 808 that has been enhanced by a number of individual AR effects such as 3D text AR effect 810 and floating sphere AR effects 812. As will be appreciated, the AR effects corresponding to any AR effects icon may include a number of individual AR effects.

User interface screen 804 also includes navigation cue 814 comprising "Exit" text 816 and downward-facing pointer 818. Upon receipt of a downward swipe on a touchpad 124/502 as suggested by navigation cue 814, user interface screen 804 will be dismissed and there will be a return to user interface screen 802.

While the glasses 100/500 are in the state illustrated in FIG. 8C and describe above, capture of the scene and its various applied AR effects can be initiated using one of the buttons 126 on the glasses. In one example, receipt of a short button press on the left button 126 initiates video capture of the scene with subsequent receipt of a long button press on the left button terminating video capture that is in process. Receipt of a long button press on the left button initiates still image capture if no video capture is in process. Of course various combinations of button presses and durations may be used to initiate and terminate capture of a content item. When content capture, as initiated by receipt of user input on buttons 126, is complete, the user interface screen 902, described below, is displayed.

Figures 9A, 9B, 9C:
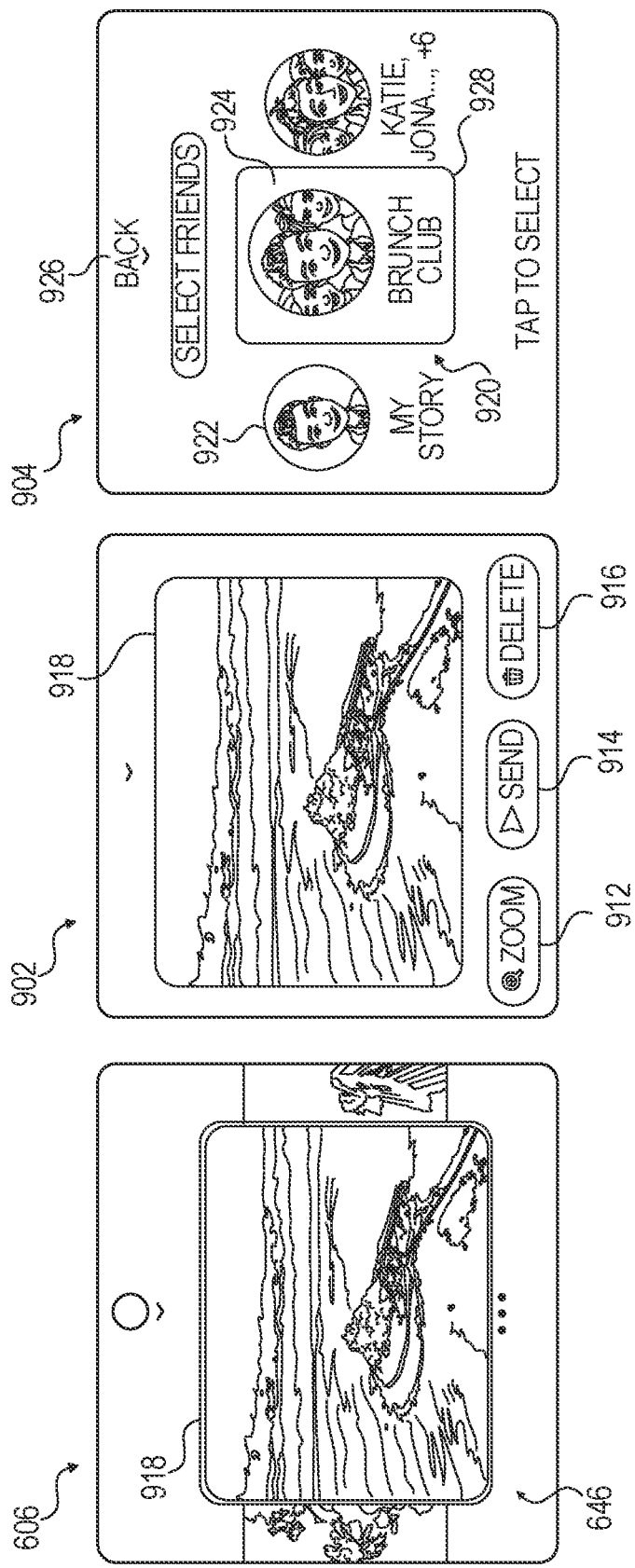

FIGS. 9A to 9F illustrate a further sequence of user interface screens displayed by the head-worn device of FIG. 1 or FIG. 5 in accordance with some examples. More particularly, FIGS. 9A to 9F illustrate example user interfaces depicting the forwarding of a content item. Shown in FIG. 9B is a content preview user interface screen 902, which has either been reached by receipt of a tap on a touchpad 124/502 when user interface screen 606 is displayed as shown in FIG. 9A (to select a content item 918 in the central position in carousel 646) or after the termination of content capture as described above with reference to FIG. 8C. For the purposes of clarity, the remaining user interface screens of FIG. 9 will be described with reference to content item 918 in content gallery user interface screen 606, but it will be appreciated that these examples apply equally to content that has just been captured.

User interface screen 902 shown in FIG. 9B includes a preview of the content item 918, a zoom icon 912, a send icon 914 and a delete icon 916. In the example shown, the send icon 914 is highlighted as the initial default for an input to be received in user interface screen 902. In this state, receipt of a tap on a touchpad 124/touchpad 502 will result in a transition to the recipient-selection user interface screen

904. However, zoom icon 912 or delete icon 916 may be highlighted (and thus selectable) upon relevant forward or backward swipe inputs on a touchpad 124/502.

Receipt of a tap on a touchpad 124/502 when zoom icon 912 is selected will transition into a content viewer user interface (not illustrated) in which the content item 918 is played back (in the case of content item being a video or gif or having dynamic AR effects) or displayed in a larger format if content item 918 is a still image. As before, receipt of a downward swipe in the content viewer user interface will return to user interface screen 902.

Receipt of a tap on a touchpad 124/502 when delete icon 916 is selected will discard the content item 918 (possibly after requesting confirmation) and a return to the prior user interface, which may be user interface screen 606 or user interface screen 804.

Receipt of a tap on a touchpad 124/502 when send icon 914 is selected will transition into the recipient-selection user interface screen 904 of FIG. 9C, in which a carousel 920 of potential recipients is shown, for example recipient 922 and recipient 924. In this context, a recipient may be an individual recipient, a group of recipients (for example "Brunch Club" recipient 924, "Besties"), or a nonhuman recipient (for example "My Story" recipient 922). Selection of non-human recipients may for example result in a content item being added to a social media or messaging application feed, or a map indicating the location of the scene and identifying user information, provided appropriate permissions allowing same have been obtained.

As before, a forward or rearward swipe input on a touchpad 124/502 will cause left or right movement of the recipients in the carousel 920, with recipients sequentially replacing a recipient in the central position as the carousel 920 scrolls left or right. The particular direction in which the carousel 920 moves in response to a forward or rearward swipe will depend on whether a touchpad is on the left or the right side of the glasses 100/500 is being used as discussed above with reference to FIG. 1.

A recipient occupying the central position in carousel 920 can be selected by tapping on the touchpad 124/502. A recipient occupying a central position may be highlighted, for example by being enclosed in a frame 928 or by using another highlighting technique such as increased size or by adjusting the colors relative to adjacent recipients.

Receipt of a tap input on touchpad 124/502 when in user interface screen 904 will select (or deselect if already selected) the recipient 924 in the central position as illustrated in FIG. 9D. As illustrated, a recipient that has been selected is indicated with a check mark 930. Additionally, once a recipient has been selected, a navigation cue 932 including a send icon 934 and a pointer 936 is displayed. The navigation cue 932 is located in a position in the user interface screen 908 that is at the start of the direction of the user input that is required. That is, the navigation cue 932 is located at the bottom of the user interface screen 602 while the corresponding input action on the touchpad is upwards towards the top of a touchpad 124/502.

As illustrated in FIG. 9E, after one recipient has been selected, additional recipients can be selected by continued scrolling of the carousel 920 in response to forward or rearward touch input on a touchpad 124/502 to bring another recipient 922 into the central position 624, selection of which is also illustrated with a check mark 938. After one or more recipients have been selected as shown in user interface screen 906 or user interface screen 908, receipt of an upward swipe on a touchpad 124/502 as prompted by navigation cue 932 will result in a transition to user interface screen 910.

As illustrated in FIG. 9F, user interface screen 910 includes a send icon 934 and a cloud or list 940 of selected recipients. Also included is a text prompt 942 indicating "Tap to Send." Receipt of a tap input on a touchpad 124/500 will transmit the content item 918 to the selected recipients. The glasses 100/500 will then return to displaying either the user interface screen 804 of FIG. 8C or the user interface screen 606 of FIG. 9A and FIG. 6C depending on how the user interface screen 902 was reached. In other examples, the glasses may return to another user interface screen, for example user interface screen 602.

The user interfaces screens shown in FIG. 9B to FIG. 9F will be dismissed on receipt of a downward swipe on a touchpad 124/502 as shown by the downwardly-facing pointer 926. In one example, a downward swipe received while displaying user interface screen 910 will return to user interface screen 908, while a downward swipe received while displaying user interface screen 904, user interface screen 906 or user interface screen 908 will return to user interface screen 902, while a downward swipe received while displaying user interface screen 902 will return to user interface screen 606.

Figure 10:
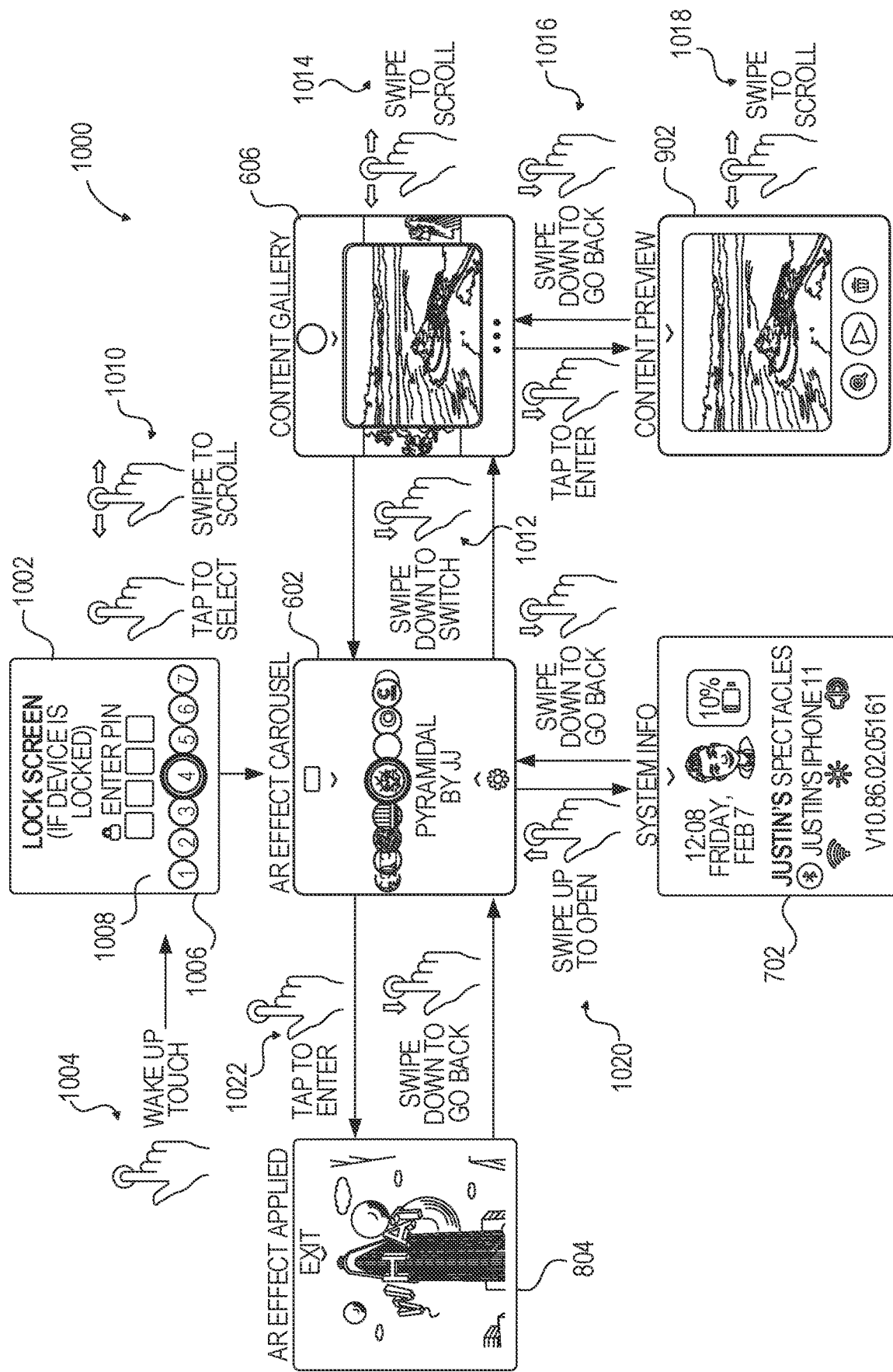
FIG. 10 illustrates a user interface flow diagram that may be implemented by the head-worn device of FIG. 1 or FIG. 5 in accordance with some examples.

FIG. 10 illustrates a user interface flow diagram 1000 that may be implemented by the glasses 100/500 in accordance with some examples. The flow diagram 1000 commences with the glasses 100/500 in a sleep state. The glasses 100/500 wake on receipt of a touch input 1004 on a touchpad 124/502 or a press on one of the buttons 126. In response, if the glasses 100/500 are locked, user interface screen 1002 is presented, prompting the entry of a PIN number. As can be seen, user interface screen 1002 includes a keypad display 1006 and entry fields 1008.

The keypad display 1006 is traversed by forward and backward swipe inputs received on a touchpad 124/502 and a highlighted number is selected for inclusion and display in the entry fields 1008 upon receipt of a tap input on a touchpad 124/502, as illustrated by tap and swipe inputs 1010. Upon receipt of a correct PIN, the glasses 100/500 transition to the user interface screen 602 illustrating the AR effects carousel 610 described above.

From the user interface screen 602, receipt of a downward swipe input 1012 transitions to the user interface screen 606 corresponding to the content gallery, and receipt of a downward swipe input 1012 transitions back to the user interface screen 602 from the content gallery user interface screen 606.

Within user interface screen 606, swipe input 1014 can be used to scroll between content items as discussed above with reference to FIG. 9A. Within user interface screen 606, receipt of a tap input transitions to user interface screen 902 representing a preview of the content item as discussed in more detail above, while in user interface screen 902, receipt of a downward swipe returns to the user interface screen 606 as illustrated by inputs 1016. Within user interface screen 902, swipe input 1018 can be used to select the zoom icon 912, send icon 914 or delete icon 916 as discussed above with reference to FIG. 9.

From the user interface screen 602, receipt of an upward swipe input transitions to the settings or system information user interface screen 702, and receipt of a downward swipe input transitions back to the user interface screen 602 from the user interface screen 702, as illustrated by inputs 1020.

Similarly, from the user interface screen 602 with an icon in the central position 624, receipt of a tap input causes display of AR-effect-applied user interface screen 804, and receipt of a downward swipe input transitions back to the user interface screen 602 from the user interface screen 804 as illustrated by inputs 1022. Additional features or screens associated with FIG. 10 are described above with reference to FIG. 6 to FIG. 9.

Figure 11:
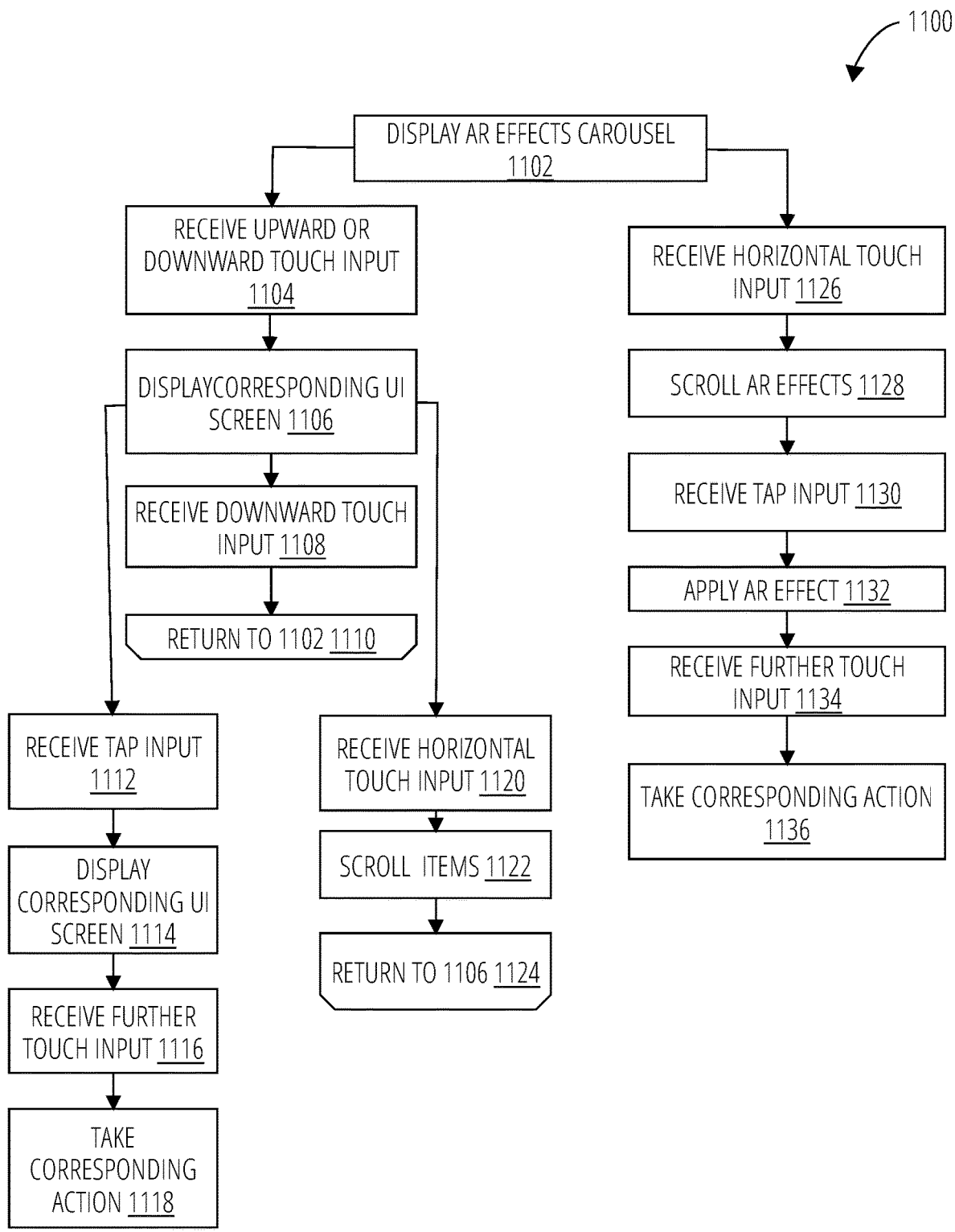
FIG. 11 is a flowchart illustrating operations performed by the head-worn device of FIG. 1 or FIG. 5 in response to receiving user input on a touchpad, according to some examples.

FIG. 11 is a flowchart 1100 illustrating operations performed by glasses 100/500 in response to receiving user input on a touchpad, according to some examples. For explanatory purposes, the operations of the flowchart 1100 are described herein as occurring in serial, or linearly. However, multiple operations of the flowchart 1100 may occur in parallel. In addition, the operations of the flowchart 1100 need not be performed in the order shown and/or one or more blocks of the flowchart 1100 need not be performed and/or can be replaced by other operations.

The operations illustrated in FIG. 11 will typically execute on the data processor 302 and associated hardware in or associated with the glasses 100/500. For the purposes of clarity, flowchart 1100 is discussed herein with reference to such an example. Various implementations are of course possible, with some of the operations taking place in client device 328 in an application such as messaging application 1346, on server system 332, or with one application on the client device 328 calling another application or SDK for required functionality. In one example, the operations are performed jointly between messaging application 1346 running on the client device 328 and the data processor 302 and associated hardware in or associated with the glasses 100.

The method starts at operation 1102 with the glasses 100/500 displaying the user interface screen 602 illustrating the AR effects carousel 610, with the navigation cue 626 above it and the navigation cue 628 below it. As mentioned, the navigation cues include an icon and a pointer, the icon indicating a result or destination of a swipe input on a touchpad with the pointer indicating the direction of a swipe input, with the navigation cue being located in a position in the user interface screen 602 that is at the start of the direction of the user input that is required.

Upon receiving vertical (i.e., upward or downward) touch input on a touchpad 124/502 in operation 1104, the glasses 100/500 display the corresponding user interface as indicated by navigation cue 626 or navigation cue 628 in operation 1106, for example user interface screen 606 or user interface screen 702 respectively as described above with reference to FIG. 6 and FIG. 7. Upon receiving a downward touch input in that user interface screen at operation 1108, the glasses return in operation 1110 to the display of AR effects carousel 610, in operation 1102.

During display of a user interface screen at operation 1106, receipt of a horizontal (e.g., forward or backward) touch input at operation 1120 results in the scrolling of displayed items (if appropriate, for example for user interface screen 606 but not for user interface screen 702), at operation 1122, followed by a return to display of the relevant user interface screen, at operation 1106.

During display of a user interface screen at operation 1106, receipt of a tap input at operation 1112 results in the display of a corresponding user interface screen at operation 1114 (if appropriate, for example from user interface screen 606 but not from user interface screen 702) in which an item selected by scrolling as described in operation 1120 to operation 1122 is presented on a user interface screen. For example, content item 918 as presented in user interface screen 606. Further touch input can then be received at operation 1116 and a corresponding action taken at operation 1118. An example of such inputs and corresponding actions are discussed herein with reference to FIG. 9, FIG. 10 and FIG. 13.

During display of the AR effects user interface screen 602 by glasses 100/500 at operation 1102, receipt of a horizontal (e.g., forward or backward) touch input at operation 1126 results in the scrolling of AR effects icons in operation 1128 as discussed above with reference to FIG. 6. Upon receipt of a tap input at operation 1130 with an AR effects icon in the central position, the user interface screen 804 is displayed in which the corresponding AR effects are applied to the scene viewed by cameras 114, in operation 1132. Further touch input received in operation 1134 will then result in a corresponding action being taken in operation 1136. An example of such inputs and corresponding actions are discussed herein with reference to FIG. 8, FIG. 9, FIG. 10 and FIG. 13.

Upon completion of corresponding actions in operation 1118 or 1136, the glasses 100/300 will typically return to user interface screen 602 or user interface screen 606 for further operations as described herein.

Figure 12:
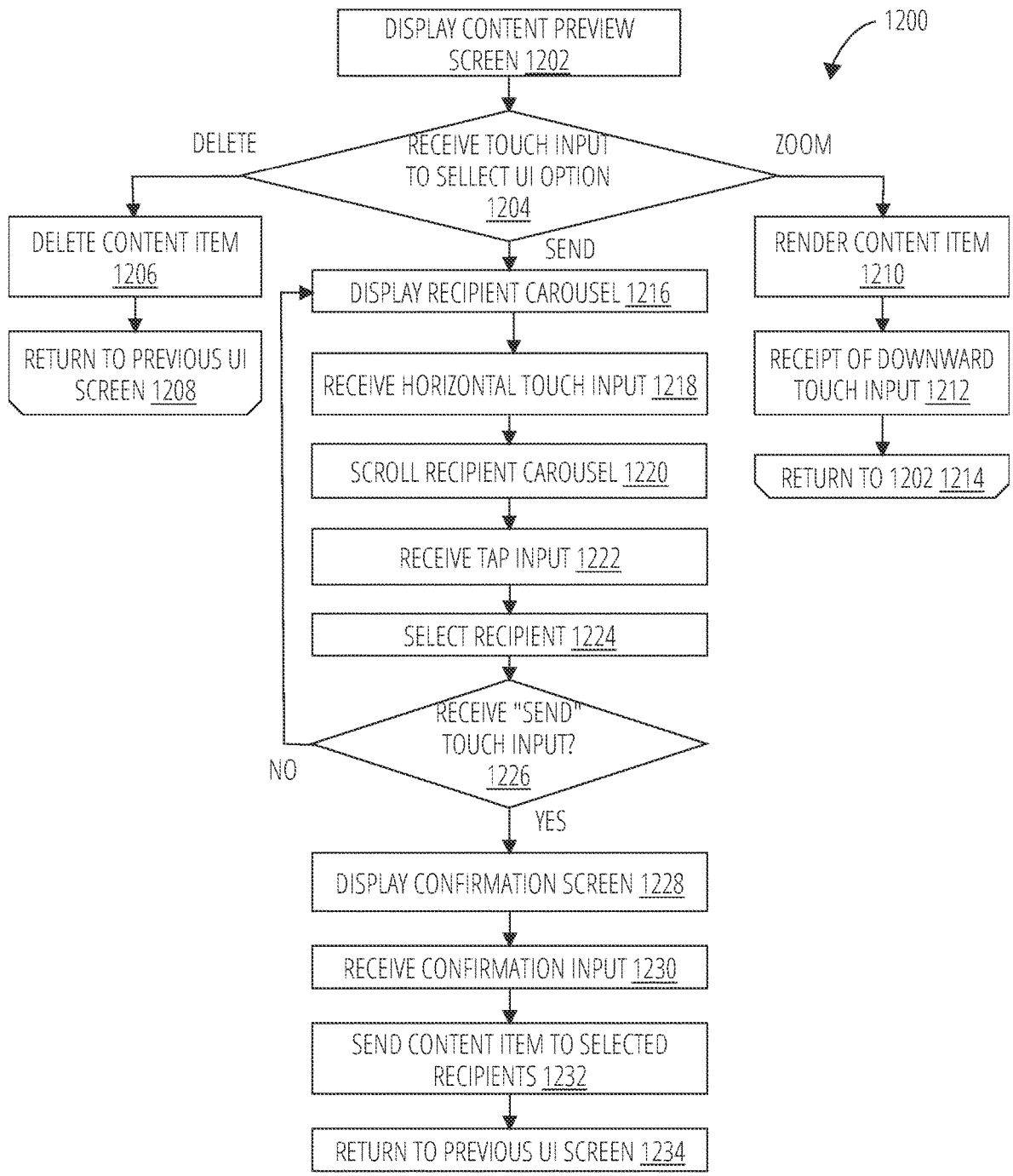
FIG. 12 is a flowchart illustrating operations performed by the head-worn device of FIG. 1 or FIG. 5 in response to receiving user input on a touchpad, according to some examples.

FIG. 12 is a flowchart 1200 illustrating content item selection and sending operations performed by glasses 100/500 in response to receiving user input on a touchpad, according to some examples. For explanatory purposes, the operations of the flowchart 1200 are described herein as occurring in serial, or linearly. However, multiple operations of the flowchart 1200 may occur in parallel. In addition, the operations of the flowchart 1200 need not be performed in the order shown and/or one or more blocks of the flowchart 1200 need not be performed and/or can be replaced by other operations.

The operations illustrated in FIG. 12 will typically execute on the data processor 302 and associated hardware in or associated with the glasses 100/500. For the purposes of clarity, flowchart 1200 is discussed herein with reference to such an example. Various implementations are of course possible, with some of the operations taking place in client device 328 in an application such as messaging application 1346, on server system 332, or with one application on the client device 328 calling another application or SDK for required functionality. In one example, the operations are performed jointly between messaging application 1346 running on the client device 328 and the data processor 302 and associated hardware in or associated with the glasses 100.

The method starts at operation 1202 with the glasses 100/500 displaying the content preview user interface screen 902. As discussed above, this screen may have been reached either by scrolling and a tap to select a content item in user interface screen 606, or as a result of content-capture user input received in user interface screen 804. User interface screen 902 includes three options that can be selected, in operation 1204, in response to scrolling in response to horizontal touch inputs (forward or backward) and receipt of a touch input on a touchpad 124/502, as discussed above with reference to FIG. 9B.

Upon receipt of a touch input when delete icon 916 is selected, the content item shown in the user interface screen 902 is deleted in operation 1206 and the glasses 100/500 return to the previous user interface screen displayed prior to the user interface screen 902, in operation 1208. In one example this would either be user interface screen 606 or user interface screen 804.

Upon receipt of a tap on a touchpad 124/502 in operation 1204 when zoom icon 912 is selected, a content viewer user interface is displayed by glasses 100/500 in operation 1210, in which the content item shown in user interface screen 902 is played back (in the case of content item being a video or gif or having dynamic AR effects) or displayed in a larger format if the content item is a still image. Receipt of a downward swipe on a touchpad 124/502 in operation 1212 will return in operation 1214 to the display of content preview user interface screen 902, at operation 1202.

Upon receipt of a tap on a touchpad 124/502 in operation 1204 when send icon 914 is selected, an address book or recipient-selection user interface screen 904 is displayed in operation 1216, in which a carousel 920 of potential recipients is shown.

As before, a forward or rearward swipe input in operation 1218 on a touchpad 124/502 will cause left or right movement of the recipients in the recipient selection carousel 920, in operation 1220, with recipients sequentially replacing a recipient in the central position as the carousel scrolls left or right.

A recipient occupying the central position in the carousel 920 can be selected in operation 1224 in response to a tap input on a touchpad 124/502 in operation 1222, or deselected if already selected. As discussed above with reference to FIG. 9D and FIG. 9E, a recipient that has been selected is indicated with a check mark and once a recipient has been selected, a "Send" navigation cue is displayed.

If a touch input corresponding to a send instruction is not received at operation 1226, the method returns to operation 1216 permitting the selection of additional recipients in operation 1218 to operation 1224. After one or more recipients have been selected as shown in user interface screen 906 or user interface screen 908, receipt of a send input at operation 1126, such as an upward swipe on a touchpad 124/502 as prompted by navigation cue 932, will result in a transition to a confirmation user input screen in operation 1228, such as user interface screen 910. Receipt of a confirmatory user input at operation 1230, such as a tap input in response to send icon 934, causes the glasses 100/500 or the associated client device 328 to transmit the content item to the selected recipients in operation 1232.

Upon completion of sending of the content item to the selected recipients in operation 1232, the glasses 100/300 will typically return in operation 1234 to displaying either the user interface screen 804 of FIG. 8C or the user interface screen 606 of FIG. 9A/FIG. 6C depending on how the content preview user interface screen 902 was reached. In other examples, the glasses may return to another user interface screen, for example user interface screen 602, at which point further operations may be performed as described herein.

Figure 13:
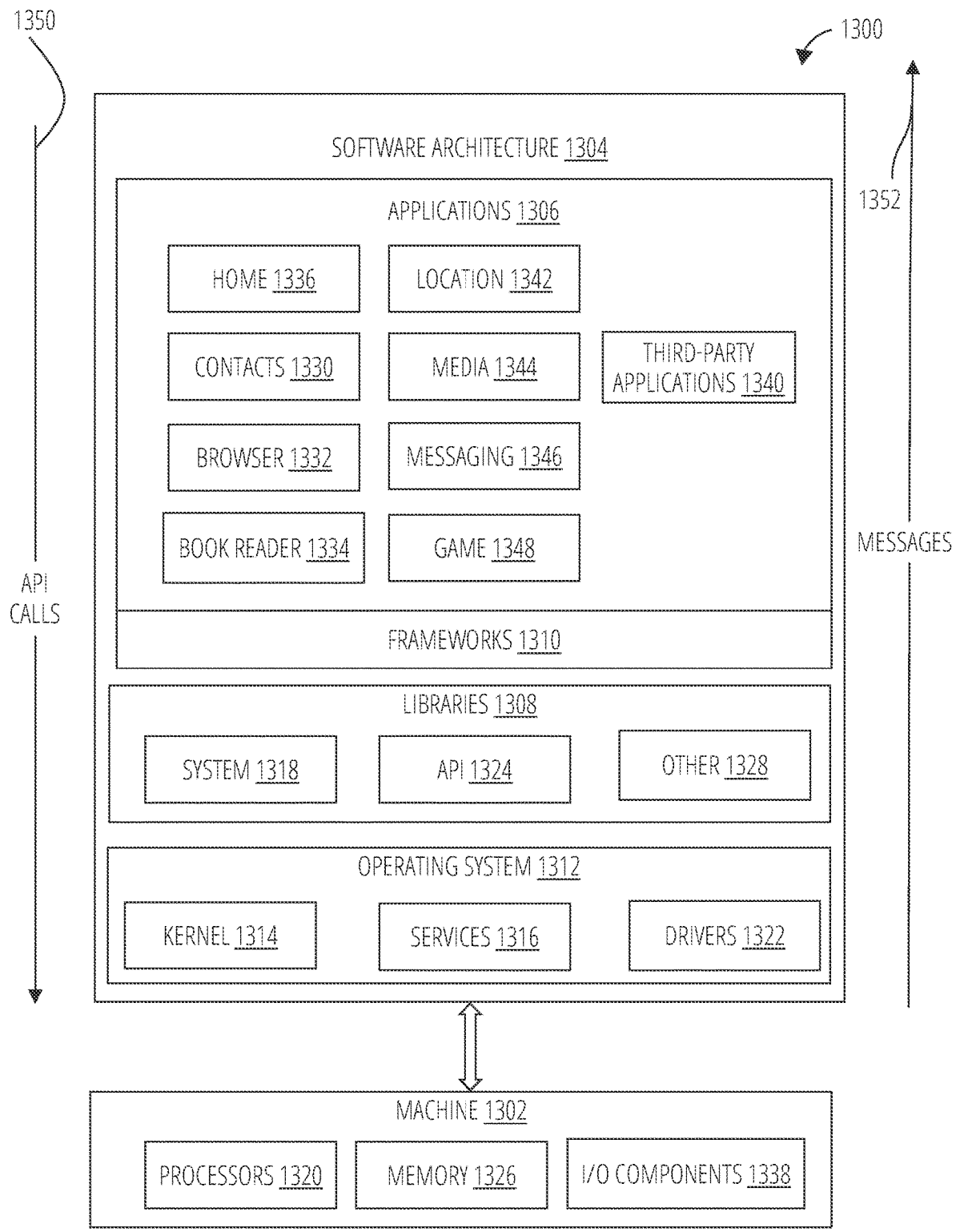
FIG. 13 is block diagram showing a software architecture within which the present disclosure may be implemented, in accordance with some examples.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1308, frameworks 1310, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1308 provide a low-level common infrastructure used by the applications 1306. The libraries 1308 can include system libraries 1318 (e.g., C standard library) that provide functions such as memory allocation functions, string manipulation functions, mathematic functions, and the like. In addition, the libraries 1308 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1308 can also include a wide variety of other libraries 1328 to provide many other APIs to the applications 1306.

The frameworks 1310 provide a high-level common infrastructure that is used by the applications 1306. For example, the frameworks 1310 provide various graphical user interface (GUI) functions, high-level resource management, and high-level location services. The frameworks 1310 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as third-party applications 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party applications 1340 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1340 can invoke the API calls 1350 provided by the operating system 1312 to facilitate functionality described herein.

Figure 14:
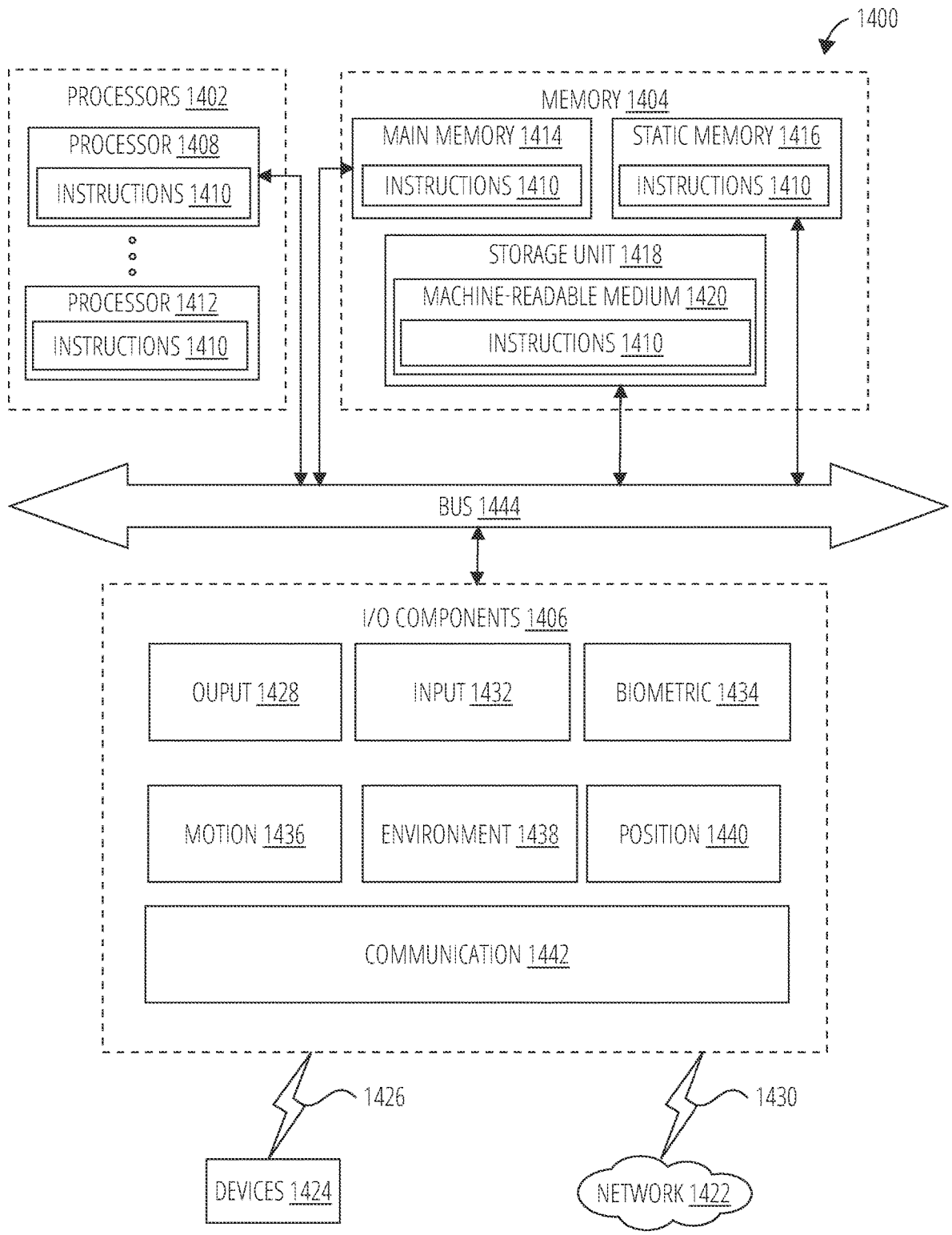
FIG. 14 is a diagrammatic representation of a machine, in the form of a computer system within which a set of instructions may be executed for causing the machine to perform any one or more of the methodologies discussed, in accordance with some examples.

FIG. 14 is a diagrammatic representation of a machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1402, memory 1404, and I/O components 1406, which may be configured to communicate with each other via a bus 1444. In an example, the processors 1402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single core, a single processor with multiple cores (e.g., a multi-core processor), multiple processors with a single core, multiple processors with multiples cores, or any combination thereof.

The memory 1404 includes a main memory 1414, a static memory 1416, and a storage unit 1418, both accessible to the processors 1402 via the bus 1444. The main memory 1404, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1402 (e.g., within the processor's cache memory), or any suitable combination thereof, during execution thereof by the networked system 300.

The I/O components 1406 may include a wide variety of components to receive input, provide output, produce output, transmit information, exchange information, capture measurements, and so on. The specific I/O components 1406 that are included in a particular machine will depend on the type of machine. For example, portable machines such as mobile phones may include a touch input device or other such input mechanisms, while a headless server machine will likely not include such a touch input device. It will be appreciated that the I/O components 1406 may include many other components that are not shown in FIG. 14. In various examples, the I/O components 1406 may include output components 1428 and input components 1432. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1432 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1406 may include biometric components 1434, motion components 1436, environmental components 1438, or position components 1440, among a wide array of other components. For example, the biometric components 1434 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1436 include acceleration sensor components (e.g., accelerometer), gravitation sensor components, rotation sensor components (e.g., gyroscope), and so forth. The environmental components 1438 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1440 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1406 further include communication components 1442 operable to couple the networked system 300 to a network 1422 or devices 1424 via a coupling 1430 and a coupling 1426, respectively. For example, the communication components 1442 may include a network interface component or another suitable device to interface with the network 1422. In further examples, the communication components 1442 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1442 may detect identifiers or include components operable to detect identifiers. For example, the communication components 1442 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1442, such as location via Internet Protocol (IP) geolocation, location via Wi-Fi® signal triangulation, location via detecting an NFC beacon signal that may indicate a particular location, and so forth.

The various memories (e.g., memory 1404, main memory 1414, static memory 1416, and/or memory of the processors 1402) and/or storage unit 1418 may store one or more sets of instructions and data structures (e.g., software) embodying or used by any one or more of the methodologies or functions described herein. These instructions (e.g., the instructions 1410), when executed by processors 1402, cause various operations to implement the disclosed examples.

The instructions 1410 may be transmitted or received over the network 1422, using a transmission medium, via a network interface device (e.g., a network interface component included in the communication components 1442) and using any one of a number of well-known transfer protocols (e.g., hypertext transfer protocol (HTTP)). Similarly, the instructions 1410 may be transmitted or received using a transmission medium via the coupling 1426 (e.g., a peer-to-peer coupling) to the devices 1424.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method of receiving and processing navigation inputs executed by one or more processors in a head-worn device system including one or more display devices, one or more cameras and a generally vertically-arranged touchpad, comprising:
displaying a first carousel of AR effects icons;
receiving a first horizontal input on the touchpad;
rotating the first carousel of AR effects icons through a selection position in response to the first horizontal input;
receiving a first touch input on the touchpad to select a particular AR effects icon that is in the selection position in the first carousel;
displaying, on the one or more display devices, AR effects overlaid on a real-world scene, the AR effects corresponding to the particular AR effects icon;
receiving content capture user input; and
in response to the content capture user input, capturing a new video or image content item of the real-world scene as viewed by the one or more cameras and overlaid by the AR effects.

2. The method of claim 1 further comprising:
receiving a first vertical input on the touchpad while the first carousel of AR effects items is being displayed;
initially, in response to receiving the first vertical input, bowing the first carousel of items in a direction of the first vertical input; and
in response to the first vertical input reaching a predetermined point, displaying a further user input interface.

3. The method of claim 2, wherein the further user input interface is a second carousel comprising a plurality of content items, the method further comprising:
receiving a second horizontal input on the touchpad;
rotating the second carousel of content items in response to the second horizontal input;
receiving a second touch input on the touchpad to select a particular content item that is in a selection position in the second carousel; and
displaying further user interface options in response to receiving the second touch input.

4. The method of claim 1, further comprising:
prior to receiving the content capture user input;
receiving a vertical input on the touchpad; and
in response to receiving the vertical input on the touchpad, dismissing the display of the AR effects applied to the scene.

5. The method of claim 3, further comprising:
receiving a second vertical input on the touchpad while the second carousel comprising a plurality of content items is being displayed; and
in response to the second vertical input, displaying the first carousel of AR effects items.

6. The method further of claim 5 wherein the first vertical input is a downward swipe, the method further comprising:
displaying a carousel icon and a downward pointer above the second carousel.

7. The method of claim 2 further comprising:
receiving a third vertical input on the touchpad while the first carousel is being displayed, the third vertical input being in a direction that is opposite to the first vertical input; and
in response to the third vertical input, displaying system information.

8. A head-worn device system comprising:
one or more cameras;
one or more display devices;
a generally vertically-arranged touchpad;
one or more processors; and
a memory storing instructions that, when executed by the one or more processors, configure the system to perform operations comprising:
displaying a first carousel of AR effects icons;
receiving a first horizontal input on the touchpad;
rotating the first carousel of AR effects icons through a selection position in response to first horizontal input;
receiving a first touch input on the touchpad to select a particular AR effects icon that is in the selection position in the first carousel;
displaying, on the one or more display devices, AR effects overlaid on a real-world scene, the AR effects corresponding to the particular AR effects icon;
receiving content capture user input; and
in response to the content capture user input, capturing a new video or image content item of the real-world scene as viewed by the one or more cameras and overlaid by the AR effects.

9. The head-worn device system of claim 8, wherein the operations further comprise:
receiving a first vertical input on the touchpad while the first carousel of AR effects items is being displayed;
initially, in response to receiving the first vertical input, bowing the first carousel of items in a direction of the first vertical input; and
in response to the first vertical input reaching a predetermined point, displaying a further user input interface.

10. The head-worn device system of claim 9, wherein the further user input interface is a second carousel comprising a plurality of content items, the operations further comprising:
receiving a second horizontal input on the touchpad;
rotating the second carousel of content items in response to the second horizontal input;
receiving a second touch input on the touchpad to select a particular content item that is in a selection position in the second carousel; and
displaying further user interface options in response to receiving the second touch input.

11. The head-worn device system of claim 9, wherein the operations further comprise:
prior to receiving the content capture user input;
receiving a vertical input on the touchpad; and
in response to receiving the vertical input on the touchpad, dismissing the display of the AR effects applied to the scene.

12. The head-worn device system of claim 10, wherein the operations further comprise:
receiving a second vertical input on the touchpad while the second carousel comprising a plurality of content items is being displayed; and
in response to the second vertical input, displaying the first carousel of AR effects items.

13. The head-worn device system of claim 12, wherein the first vertical input is a downward swipe, the operations further comprising:
displaying a content icon and a downward pointer above the first carousel.

14. The head-worn device system of claim 12, wherein the operations further comprise:

receiving a third vertical input on the touchpad while the first carousel is being displayed, the third vertical input being in a direction that is opposite to the first vertical input; and in response to the third vertical input, displaying system information.

15. A non-transitory computer-readable storage medium, the computer-readable storage medium including instructions that when executed by a head-worn device system including one or more display devices, one or more cameras and a generally vertically-arranged touchpad, cause the head-worn device system to perform operations comprising:

displaying a first carousel of AR effects icons;
receiving a first horizontal input on the touchpad;
rotating the first carousel of AR effects icons through a selection position in response to first horizontal input;
receiving a first touch input on the touchpad to select a particular AR effects icon that is in the selection position in the first carousel;
displaying, on the one or more display devices, AR effects overlaid on a real-world scene, the AR effects corresponding to the particular AR effects icon;
receiving content capture user input; and
in response to the content capture user input, capturing a new video or image content item of the real-world scene as viewed by the one or more cameras and overlaid by the AR effects.

16. The computer-readable storage medium of claim 15 wherein the operations further comprise:

receiving a first vertical input on the touchpad while the first carousel of AR effects items is being displayed;
initially, in response to receiving the first vertical input, bowing the first carousel of items in a direction of the first vertical input; and
in response to the first vertical input reaching a predetermined point, displaying a further user input interface.

17. The computer-readable storage medium of claim 16 wherein the further user input interface is a second carousel comprising a plurality of content items, the operations further comprising:

receiving a second horizontal input on the touchpad;
rotating the second carousel of content items in response to the second horizontal input;
receiving a second touch input on the touchpad to select a particular content item that is in a selection position in the second carousel; and
displaying further user interface options in response to receiving the second touch input.

18. The computer-readable storage medium of claim 15, wherein the operations further comprise:

prior to receiving the content capture user input;
receiving a vertical input on the touchpad; and
in response to receiving the vertical input on the touchpad, dismissing the display of the AR effects applied to the scene.

19. The computer-readable storage medium of claim 17, wherein the operations further comprise: receiving a second vertical input on the touchpad while the second carousel comprising a plurality of content items is being displayed; and in response to the second vertical input, displaying the first carousel of AR effects items.

20. The computer-readable storage medium of claim 16, wherein the operations further comprise:

receiving a third vertical input on the touchpad while the first carousel is being displayed, the third vertical input being in a direction that is opposite to the first vertical input; and
in response to the third vertical input, displaying system information.

* * * * *